(12) United States Patent
Lee et al.

(10) Patent No.: US 11,600,216 B1
(45) Date of Patent: Mar. 7, 2023

(54) DISPLAY DEVICE AND OPERATING METHOD THEREOF

(71) Applicant: LG ELECTRONICS INC., Seoul (KR)

(72) Inventors: Hyeseung Lee, Seoul (KR); Donghee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/707,848

(22) Filed: Mar. 29, 2022

(30) Foreign Application Priority Data

Jan. 20, 2022 (KR) .......... 10-2022-0008795

(51) Int. Cl.
*G06F 3/04886* (2022.01)
*G09G 3/20* (2006.01)

(52) U.S. Cl.
CPC ....... *G09G 3/2096* (2013.01); *G06F 3/04886* (2013.01); *G09G 2320/0626* (2013.01); *G09G 2340/04* (2013.01); *G09G 2354/00* (2013.01)

(58) Field of Classification Search
CPC .............. G06F 3/04886; G09G 3/2096; G09G 2320/0626; G09G 2340/04; G09G 2354/00
See application file for complete search history.

(56) References Cited

U.S. PATENT DOCUMENTS

| | | | |
|---|---|---|---|
| 2011/0148926 A1 | 6/2011 | Koo et al. | |
| 2011/0157172 A1* | 6/2011 | Bennett | G06F 3/14 345/419 |
| 2011/0231795 A1 | 9/2011 | Cheon et al. | |
| 2013/0127738 A1* | 5/2013 | Miller | G06F 3/03547 345/173 |
| 2013/0187870 A1* | 7/2013 | Nakaya | G06F 3/041 345/173 |
| 2013/0252600 A1* | 9/2013 | Seo | G06F 3/023 455/420 |
| 2017/0192486 A1 | 7/2017 | Park et al. | |
| 2019/0313541 A1* | 10/2019 | Yamada | H05K 5/0208 |
| 2020/0341582 A1 | 10/2020 | Han et al. | |

FOREIGN PATENT DOCUMENTS

| | | |
|---|---|---|
| EP | 3141986 | 3/2017 |
| EP | 3253029 | 12/2017 |
| EP | 2802977 | 7/2018 |
| KR | 10-2021-0126266 | 10/2021 |

OTHER PUBLICATIONS

European Patent Office Application Serial No. 22161067.8, Search Report dated Sep. 21, 2022, 14 pages.
European Patent Office Application Serial No. 22161067.8, Search Report dated Jan. 5, 2023, 17 pages.

* cited by examiner

*Primary Examiner* — Gene W Lee
(74) *Attorney, Agent, or Firm* — Lee Hong Degerman Kang Waimey

(57) ABSTRACT

According to an embodiment of the present disclosure, a display device may include a display configured to display an image, a user input interface configured to receive a remote control input from a remote control, and a controller configured to receive a user input, obtain a type of the received user input, and change a display property according to the obtained type of the user input, wherein the type of the user input is one of a remote control input type or a touch input.

14 Claims, 27 Drawing Sheets

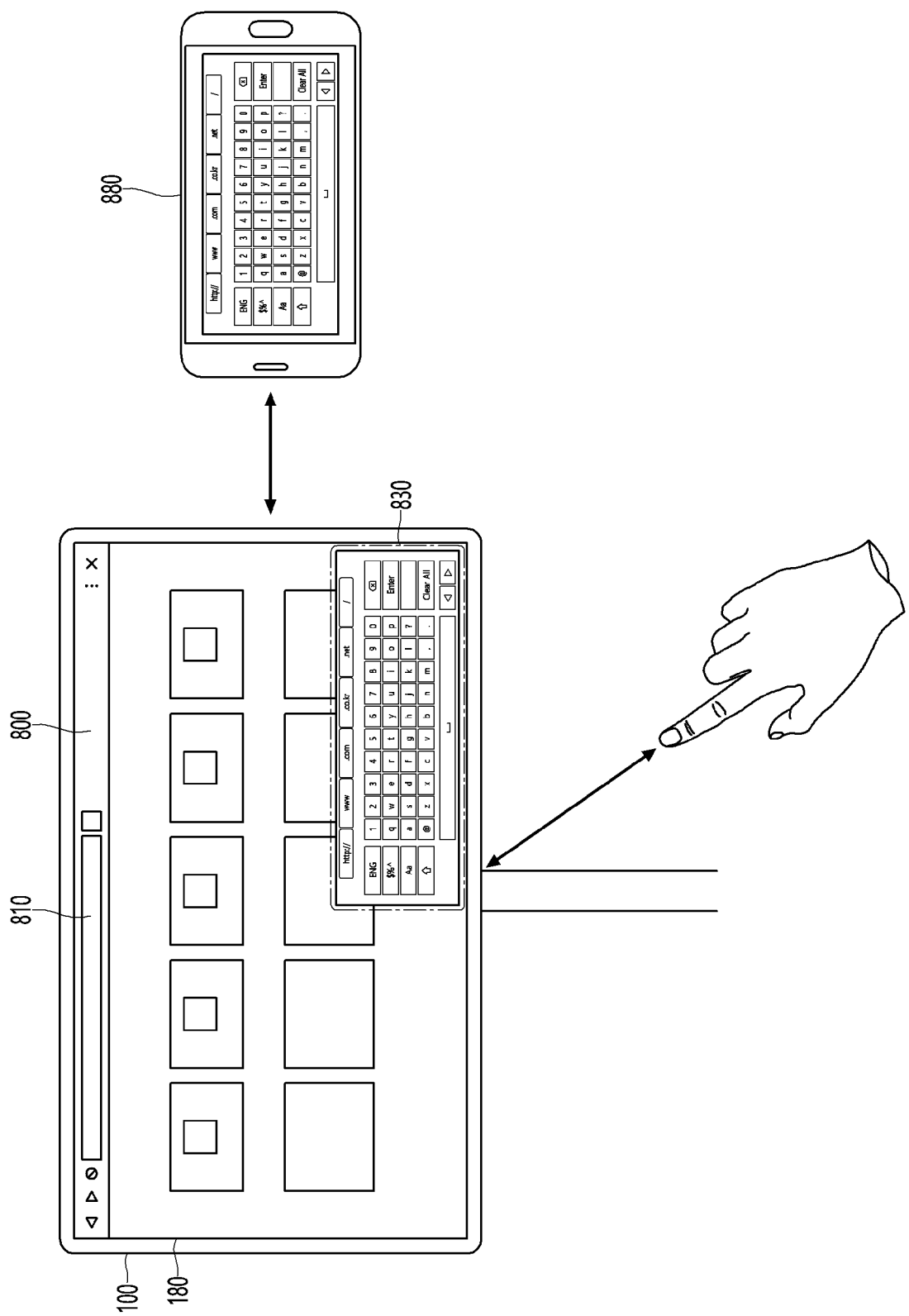

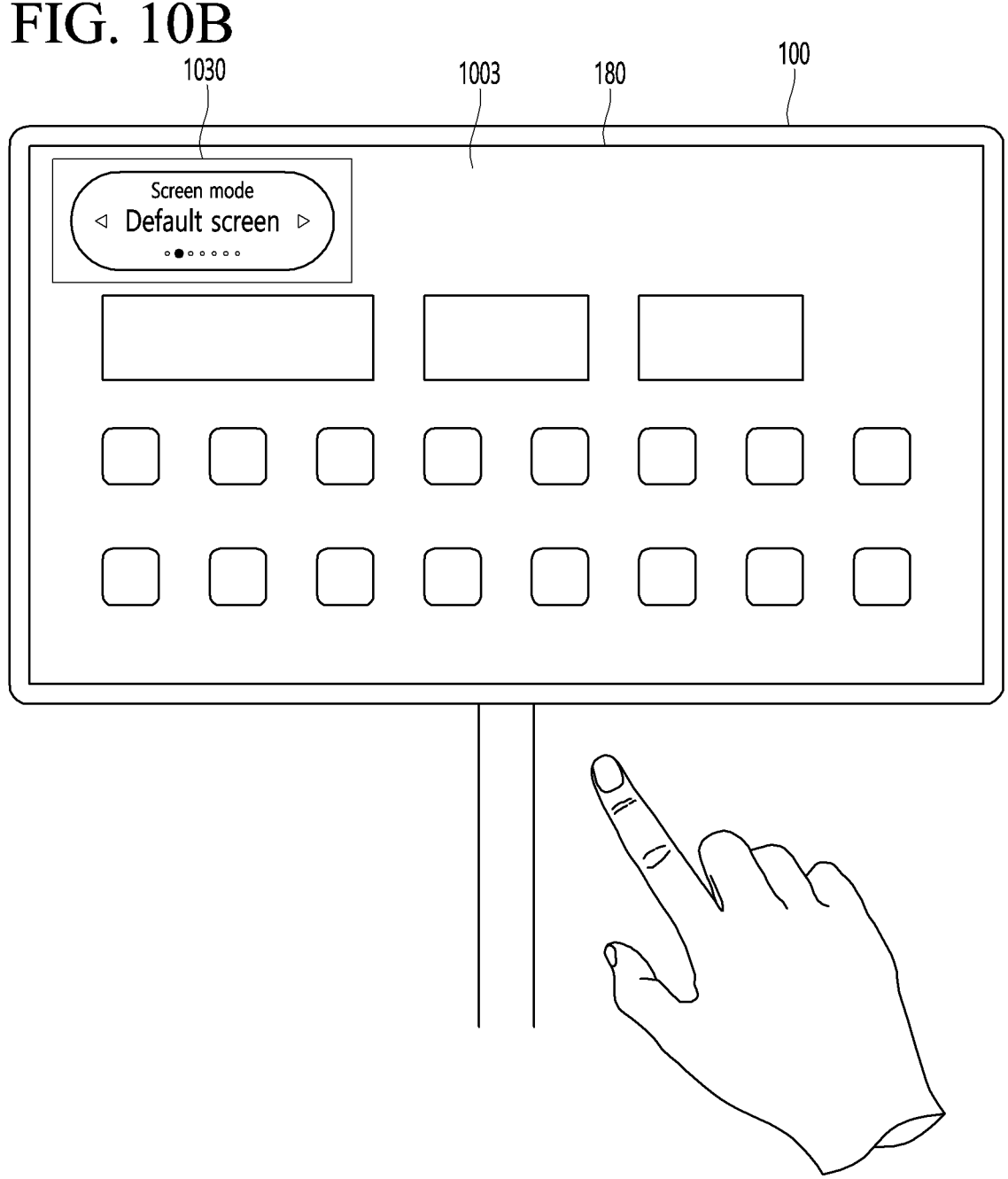

DISPLAY DEVICE AND OPERATING METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2022-0008795, filed on Jan. 20, 2022, the contents of which are hereby incorporated by reference herein in its entirety.

BACKGROUND OF THE INVENTION

1. Field of the Invention

The present disclosure relates to a display device.

2. Discussion of the Related Art

Recently, the functions of terminal are being diversified. For example, there are functions for data and voice communication, photo and video shooting through a camera, voice recording, music file playback through a speaker system, and output of images or videos to a display.

Some terminals add an electronic game play function or perform a multimedia player function.

As the functions of the terminal are diversified, the terminal is implemented with, for example, in the form of a multimedia device (Multimedia player) equipped with complex functions such as shooting still pictures or moving pictures, reproducing music or video files, playing games, receiving broadcasts, or the like.

When the display size of the terminal is larger than a specific inch (e.g., 27 inches), the user has difficulty in touching the display.

That is, in a display device having a size larger than a certain size, more finger movements are required to perform the same operation as a touch operation of a display device having the same size as a conventional tablet, which causes inconvenience to the user.

SUMMARY OF THE INVENTION

The present disclosure provides a display device for optimizing usability by changing display properties according to a type of a user input for a display device.

The present disclosure provides a display device for optimizing the use of touch.

According to an embodiment of the present disclosure, a display device may include a display configured to display an image, a user input interface configured to receive a remote control input from a remote control, and a controller configured to receive a user input, obtain a type of the received user input, and change a display property according to the obtained type of the user input, wherein the type of the user input is one of a remote control input type or a touch input.

According to an embodiment of the present disclosure, a GUI having an appropriate size may be provided according to the type of a user input, thus greatly improving the convenience of input.

According to an embodiment of the present disclosure, the screen is reduced with respect to the point of the touch input, thus optimizing the use of the user's touch. According to an embodiment of the present disclosure, glare can be prevented in the case of a user's touch input control by adjusting the output brightness of an image according to the type of a user input.

According to an embodiment of the present disclosure, the size of an image is reduced according to a touch input, preventing a user from feeling inconvenience while viewing the image.

BRIEF DESCRIPTION OF THE DRAWINGS

FIG. 8E is a view for describing a process of displaying a virtual keyboard according to keyboard information set in a mobile device connected to a display device when a touch input is performed according to an embodiment of the present disclosure.

FIGS. 10A and 10B are diagrams for describing an example of providing different screen brightness modes according to a type of a user input.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
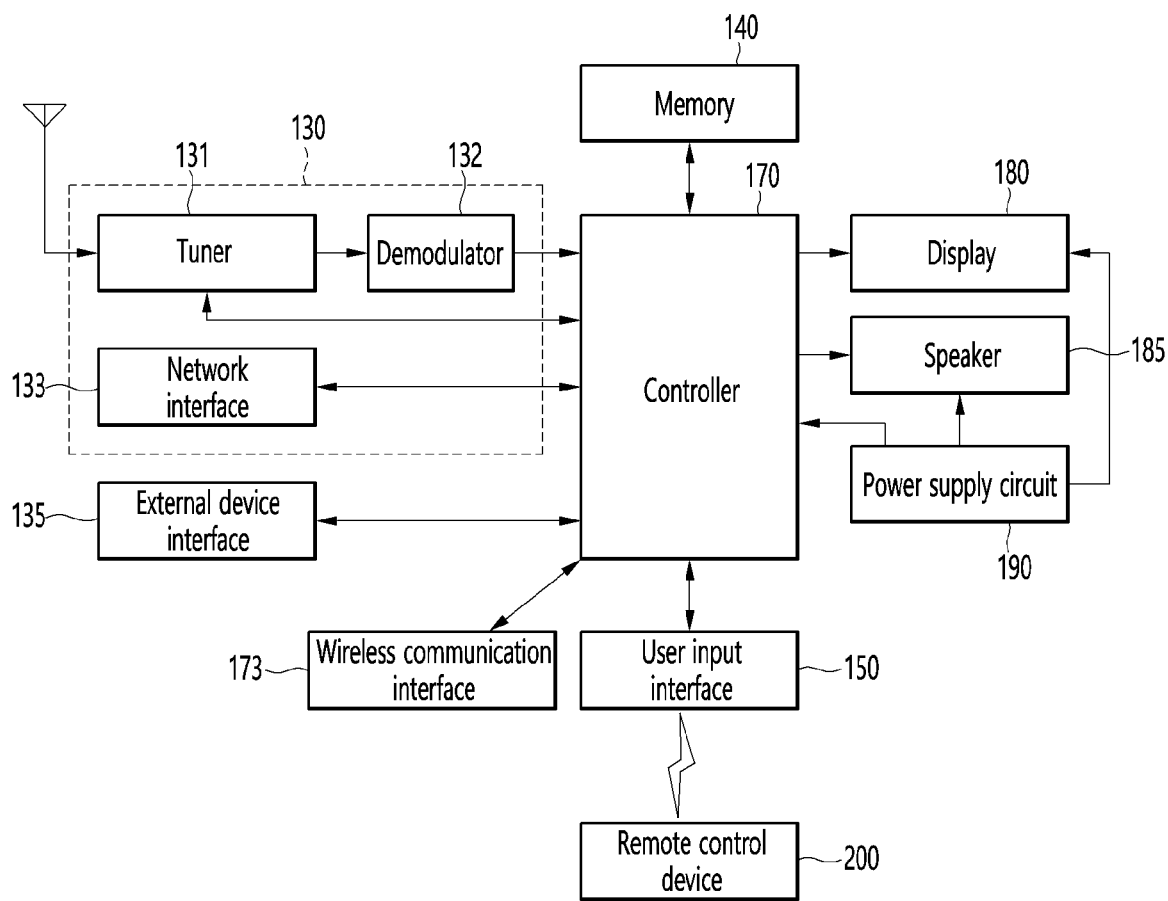
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
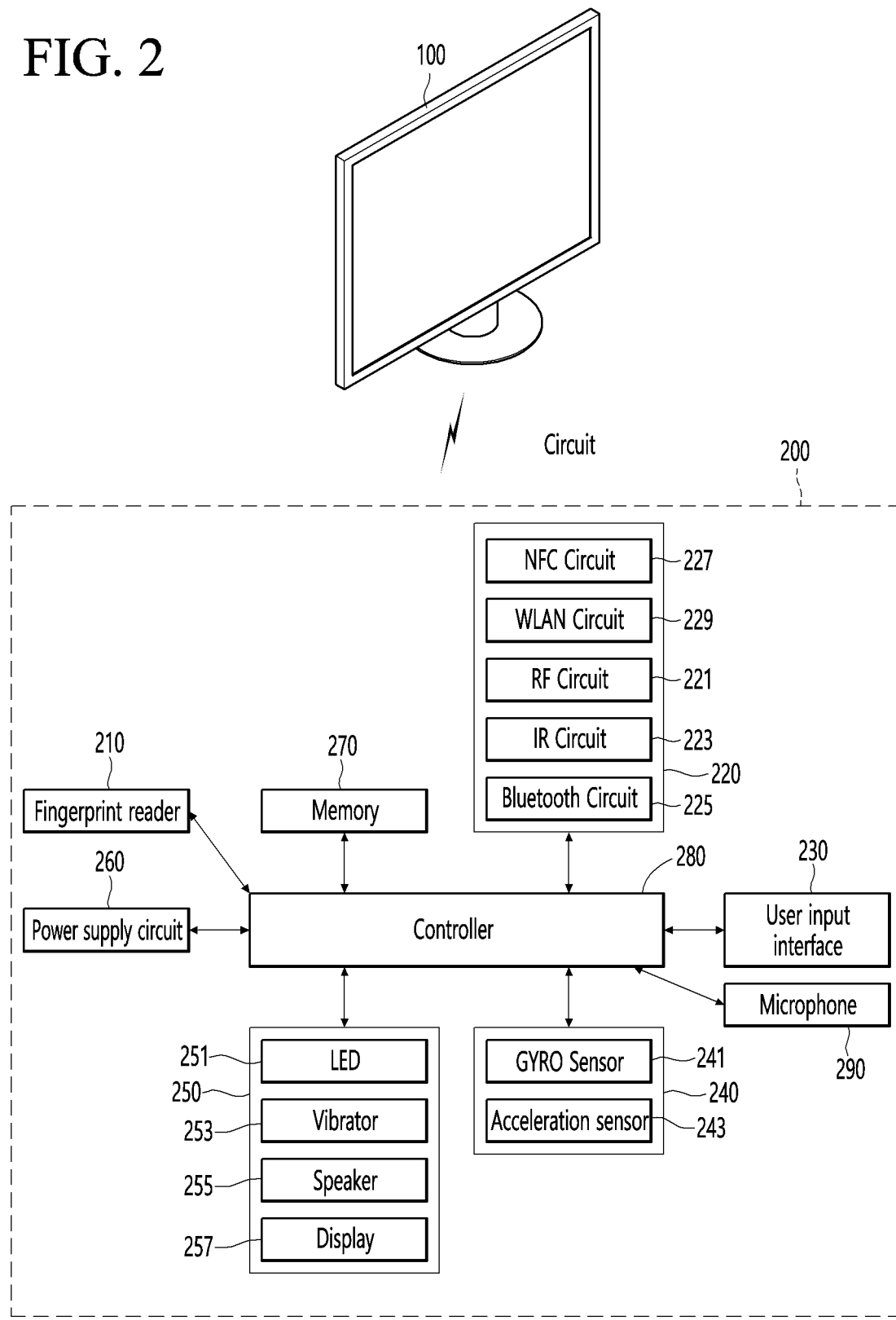
FIG. 2 is a block diagram of a remote control device according to an embodiment of the present disclosure.
Figure 3:
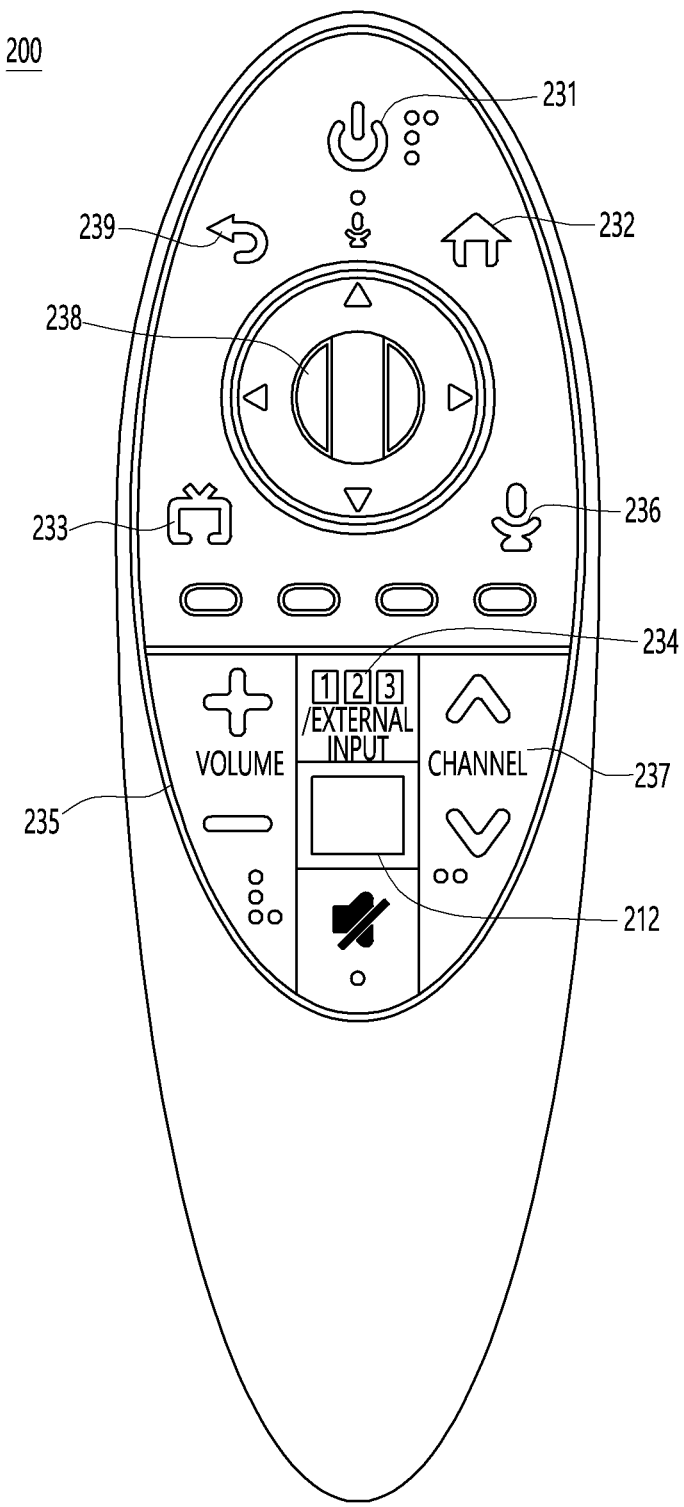
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
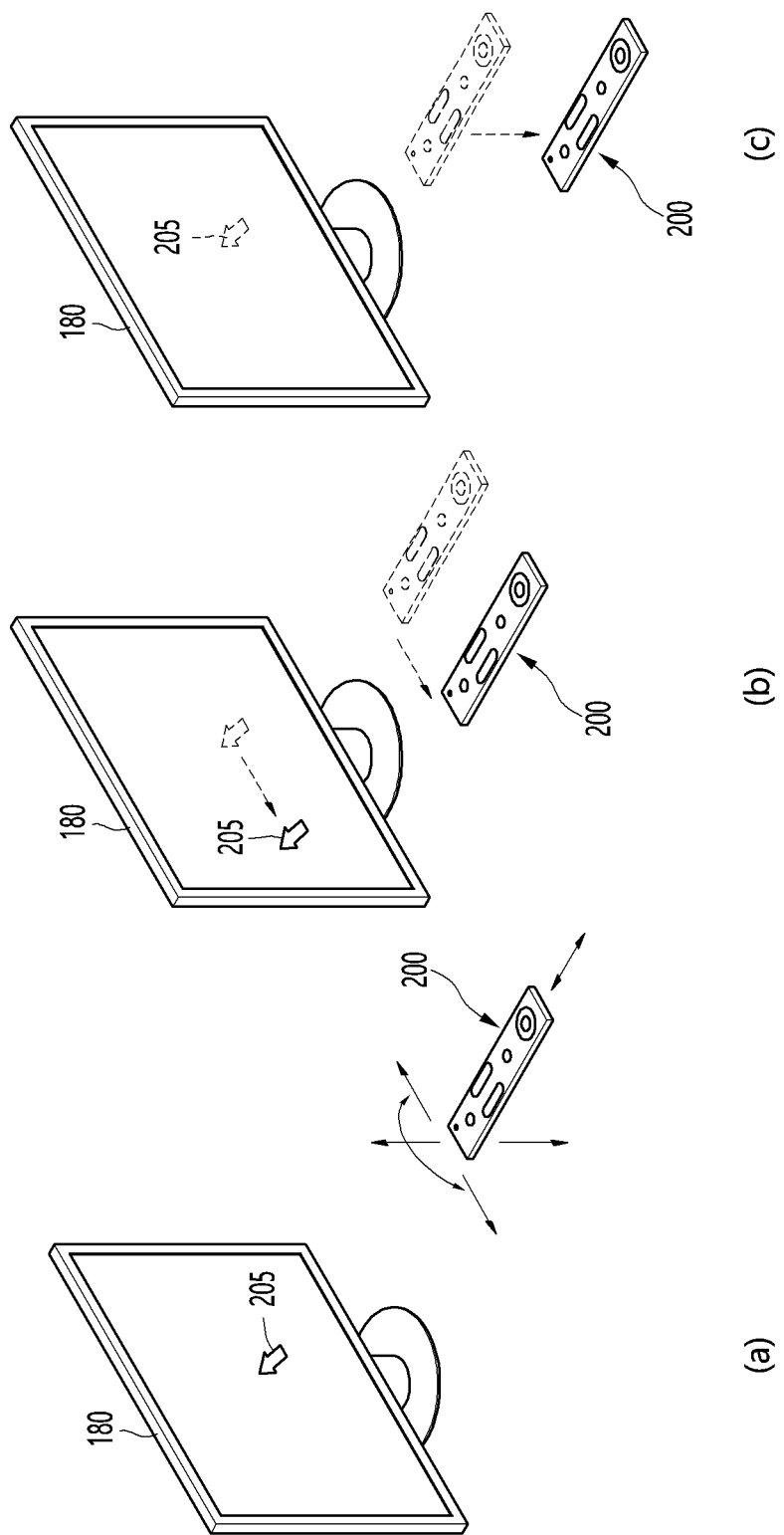
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5A:
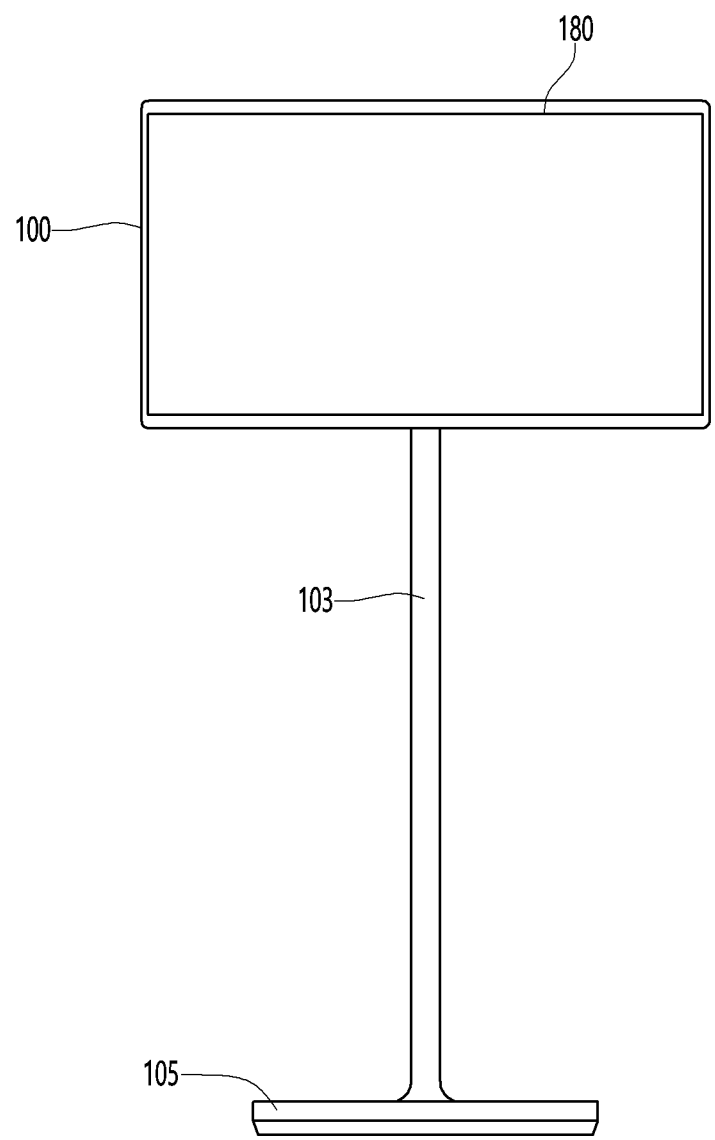
FIGS. 5A and 5B are diagrams for describing a horizontal mode and a vertical mode of a stand-type display device according to an embodiment of the present disclosure.
Figure 5B:
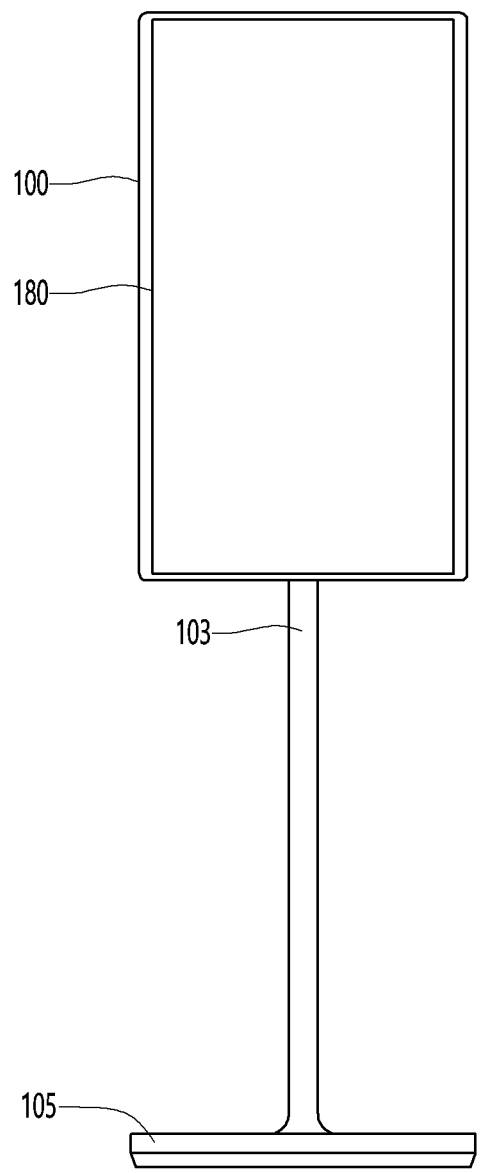

FIGS. 5A and 5B are diagrams for describing a horizontal mode and a vertical mode of a stand-type display device according to an embodiment of the present disclosure.

Referring to FIGS. 5A and 5B, a stand-type display device 100 is illustrated.

A shaft 103 and a stand base 105 may be connected to the display device 100.

The shaft 103 may connect the display device 100 and the stand base 105 to each other. The shaft 103 may extend vertically.

The lower end of the shaft 103 may be connected to the edges of the stand base 105.

The lower end of the shaft 103 may be rotatably connected to the edges of the stand base 105.

The display device 100 and the shaft 103 may rotate about a vertical axis with respect to the stand base 105.

An upper portion of the shaft 103 may be connected to the rear surface of the display device 100.

The stand base 105 may serve to support the display device 100.

The display device 100 may be configured to include the shaft 103 and the stand base 105.

The display device 100 may rotate around a point where the upper portion of the shaft 103 and the rear surface of the display 180 contact each other.

FIG. 5A shows that the display 180 operates in a landscape mode in which the horizontal length is greater than the vertical length, and FIG. 5B shows that the display 180 operates in a portrait mode in which the vertical length is greater than the horizontal length.

A user may move while holding a stand-type display device. That is, the stand-type display device has improved mobility, unlike a fixed device, so that a user is not limited by an arrangement position.

Figure 6:
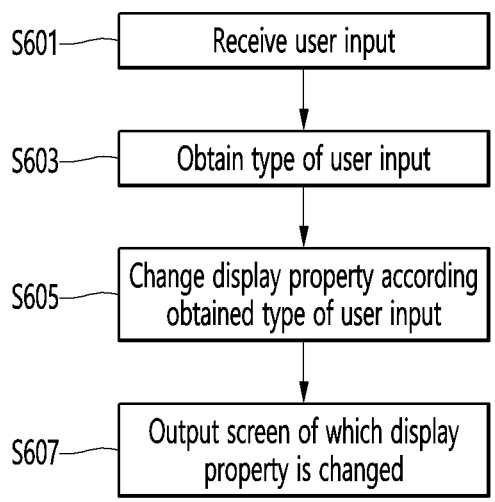
FIG. 6 is a flowchart for describing a method of operating a display device according to an embodiment of the present disclosure.

FIG. 6 is a flowchart for describing a method of operating a display device according to an embodiment of the present disclosure.

Referring to FIG. 6, the controller 170 of the display device 100 may receive a user input (S601).

In an embodiment, the type of the user input may be any one of a control input received from the remote control device 200, a touch input, and a mouse input.

The controller 170 may receive a user input while displaying an image on the display 180 and determine the type of the received user input.

The controller 170 of the display device 100 may obtain the type of the received user input (S603).

The controller 170 may determine the type of the user input based on a path through which the user input is received.

The type of the user input may be any one of a remote control input type, a touch input type, and a mouse input type.

In an embodiment, when a user input is received through the user input interface 150, the controller 170 may determine the type of the user input as a remote control input type.

When the user input is received through the display 180, the controller 170 may determine the type of the user input as a touch input type.

When the user input is received through the external device interface 135, the controller 170 may determine the type of the user input as a mouse input type. The mouse may be connected to a USB port provided in the external device interface 135.

The controller 170 of the display device 100 may change a display property according to the obtained type of the user input (S605).

In an embodiment, the display property may include one or more of a size, brightness, and position of an image displayed on the display 180.

In another embodiment, the display property may include one or more of the size, brightness, and position of graphic user interface (GUI) elements displayed on the display 180.

In still another embodiment, changing the display property may indicate changing a display mode.

In an embodiment, the mouse input type may be processed in a manner similar to that of the touch input type. This is because the distance between the display device 100 and the user may be close in both cases of the mouse input and the touch input.

The controller 170 of the display device 100 may output a screen having the changed display property through the display 180 (S607).

When a first display property is changed to a second display property according to the type of the user input, the controller 170 may display an image or GUI reflecting the changed property.

This will be described in detail with reference to the following examples.

Figure 7:
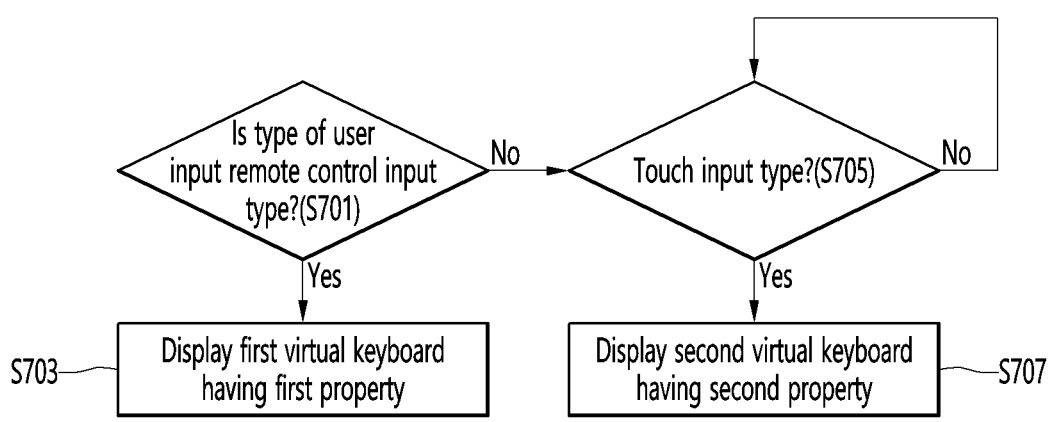
FIG. 7 is a flowchart for describing an example of changing a property of a virtual keyboard according to a type of a user input.

FIG. 7 is a flowchart for describing an example of changing a property of a virtual keyboard according to a type of a user input.

The embodiment of FIG. 7 may be a detailed view of steps S603 to S607.

Referring to FIG. 7, the controller 170 may determine whether a user input type is a remote control input type (S701).

When it is determined that the user input type is the remote control input type, the controller 170 may display a first virtual keyboard having a first property on the display 180 (S703).

When it is determined that the user input type is a touch input type (S705), the controller 170 may display a second virtual keyboard having a second property on the display 180 (S707).

In an embodiment, the size of the first virtual keyboard may be larger than the size of the second virtual keyboard. That is, the property here may indicate the size of the virtual keyboard.

When the user controls the operation of the display device 100 through the remote control device 200 and then controls the operation of the display device 100 through a touch input, the distance between the user and the display device 100 may become closer.

In this case, when the size of the virtual keyboard displayed during control through the remote control device 200 is maintained as it is, there is an inconvenience in that the user's hand movement is further increased.

Accordingly, according to an embodiment of the present disclosure, when the user input type is changed from the remote control input type to the touch input type, the controller 170 may reduce the size of the virtual keyboard.

Figure 8A:
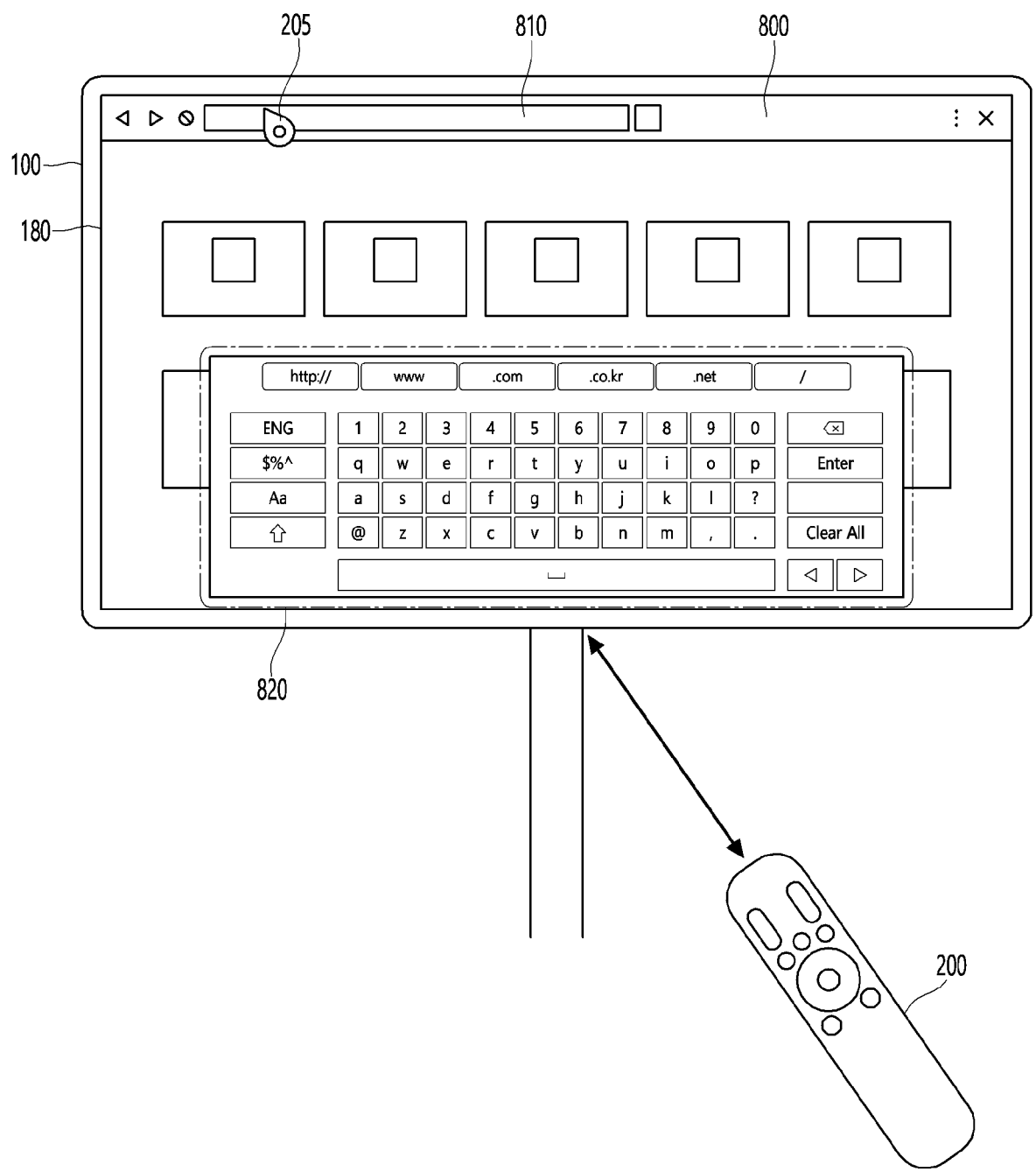
FIG. 8A is a view for describing an example of displaying a first virtual keyboard when a remote control input is received according to an embodiment of the present disclosure.
Figure 8B:
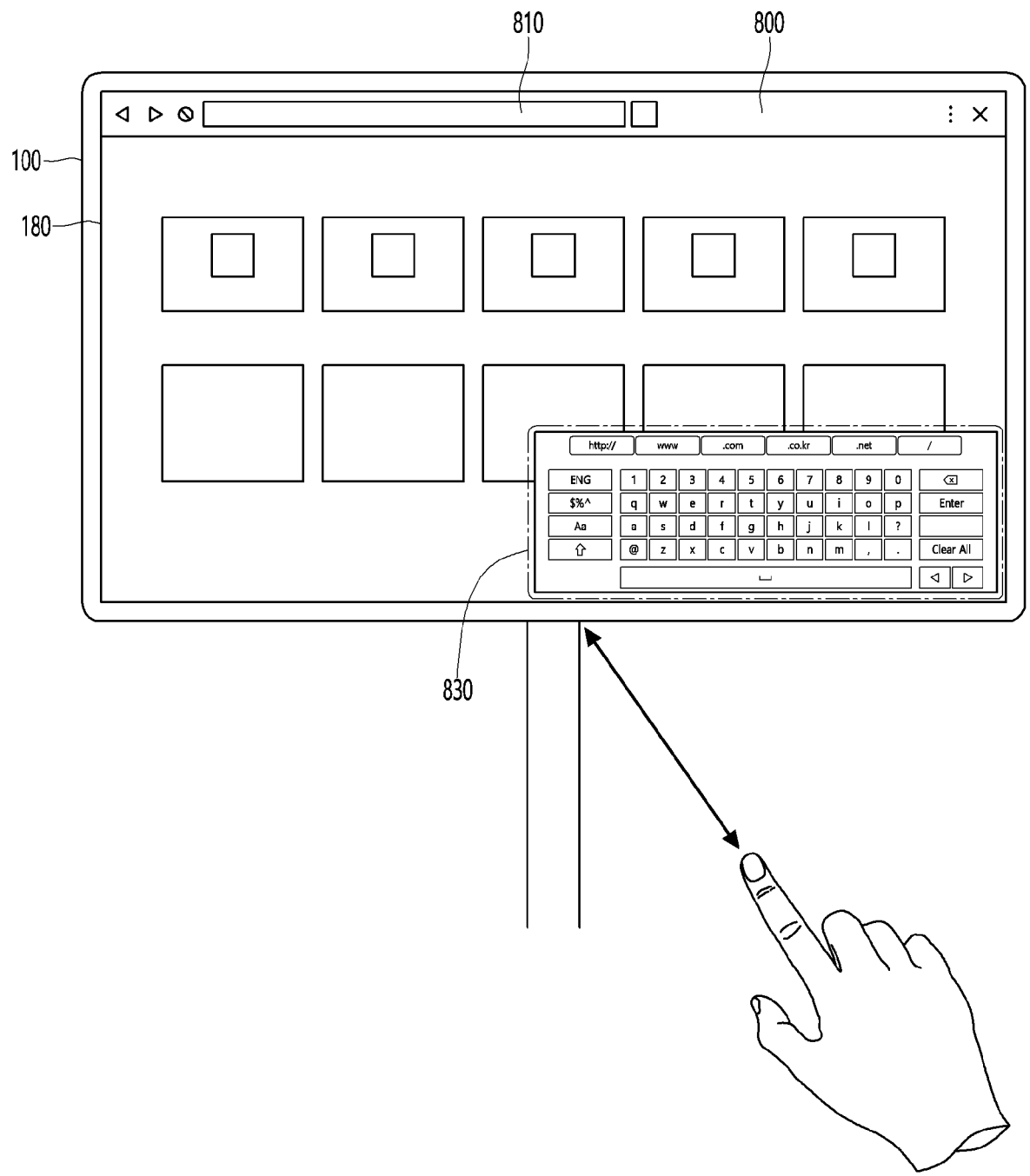
FIG. 8B is a view for describing an example of displaying a second virtual keyboard when a touch input is received according to an embodiment of the present disclosure.
Figure 8C:
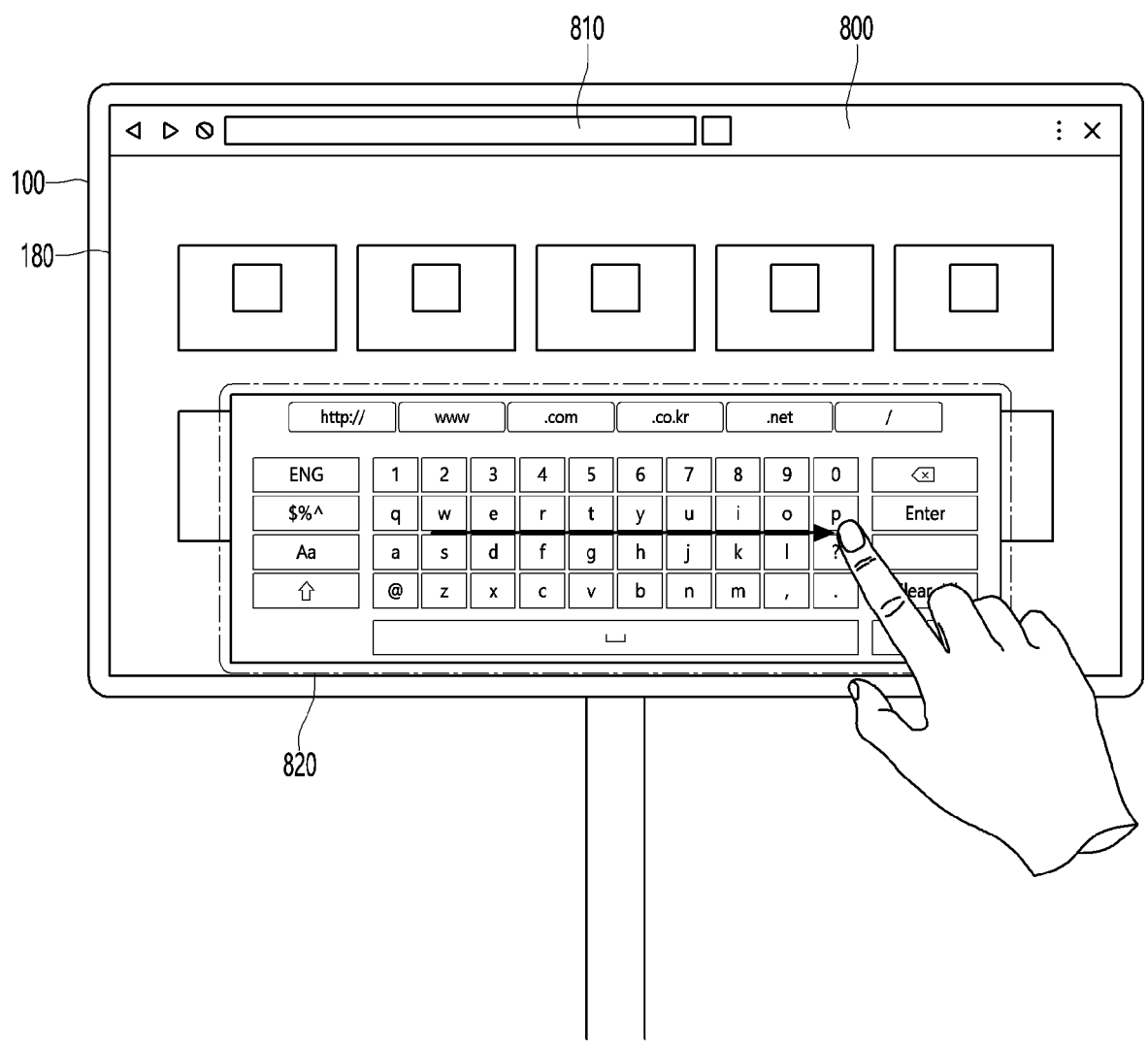
FIG. 8C is a view for describing a process of applying an input to the first virtual keyboard through a touch input according to the related art

FIG. 8A is a view for describing an example of displaying a first virtual keyboard when a remote control input is received according to an embodiment of the present disclosure, FIG. 8B is a view for describing an example of displaying a second virtual keyboard when a touch input is received according to an embodiment of the present disclosure, and FIG. 8C is a view for describing a process of applying an input to the first virtual keyboard through a touch input according to the related art.

Referring to FIG. 8A, the display device 100 may display a screen 800 including a search window 810 on the display 180.

The size of the display 180 may be any one of 27, 29, and 31 inches, but this is only an example.

The user may control the movement of a pointer 205 (also referred to as a cursor), which is controlled according to the movement of the remote control device 200 (also referred to as a remote control).

When the pointer 205 is positioned on the search window 810 and a command for text input is received from the remote control 200, the display device 100 may display a first virtual keyboard 820 having a first size on the display 180.

Referring to FIG. 8B, an example in which a user touches the search window 810 is illustrated. When a touch input is received through the search window 810, the display device 100 may display a second virtual keyboard 830 having a second size smaller than the first size on the display 180.

That is, when it is determined that the user input type is a touch input type, the display device 100 may change the first virtual keyboard 820 to the second virtual keyboard 830.

The user can apply a touch input more conveniently through the virtual keyboard having a reduced size.

Referring to FIG. 8C, if the first virtual keyboard 820 is displayed even when a touch input is applied according to the related art, the first virtual keyboard 820 is too large for a general user to use, so the user's hand movement will increase significantly.

This causes inconvenience of the user's touch input. When the user input type is changed back to the remote control input type, the display device 100 may display the first virtual keyboard 820 having the first size as shown in FIG. 8A.

That is, the fact that the user uses the remote control 200 may indicate that the distance between the display device 100 and the user increases. In this case, it is easier for the user to input text through the pointer 205 when the size of the virtual keyboard is large.

As described above, according to an embodiment of the present disclosure, the display device 100 may be provided with a virtual keyboard having an appropriate size according to the type of user input, thereby greatly improving input convenience.

Meanwhile, according to another embodiment of the present disclosure, when it is determined that the user input type is a touch input type, not only the size of the virtual keyboard but also the size of the screen being displayed may be reduced.

Figure 8D:
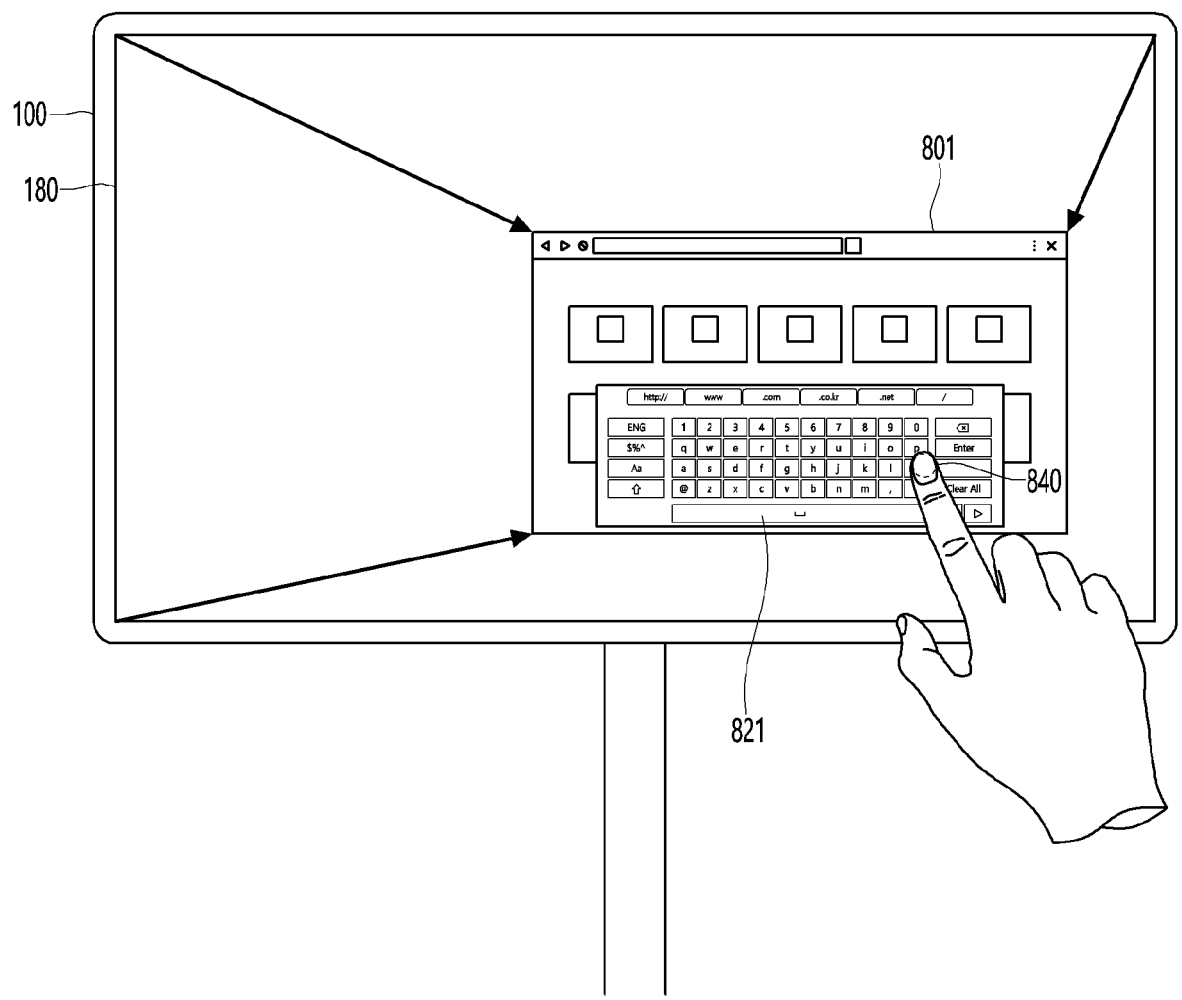
FIG. 8D is a view for describing a process of reducing the size of a screen when a touch input is received on a display, according to an embodiment of the present disclosure.

FIG. 8D is a view for describing a process of reducing the size of a screen when a touch input is received on a display, according to an embodiment of the present disclosure.

In the screen state of FIG. 8A, the display device 100 may receive a touch input at a specific point.

The display device 100 may change the size of the screen 800 to the reduced screen 801 as shown in FIG. 8D. Accordingly, as shown in FIG. 8D, the first virtual keyboard 820 may be reduced to match the ratio of the reduced screen 801.

That is, the reduced screen 801 and the reduced virtual keyboard 821 may be displayed around the touched point 840.

The size of the reduced screen 801 may correspond to the size of the tablet PC.

The controller 170 of the display device 100 may convert the coordinate system of the existing screen 800 into the coordinate system of the reduced screen 801 based on the reduced ratio and the touched point 840.

That is, the controller 170 may perform conversion of the coordinate system such that the size of the screen 800 is reduced with respect to the touched point 840.

As described above, according to an embodiment of the present disclosure, the screen is reduced with respect to the point of the touch input, thus optimizing the use of the user's touch.

Meanwhile, when a point other than the reduced screen 801 is selected, the display device 100 may perform switching to the original screen 800 and the original virtual keyboard 820 from the reduced screen 801 and the reduced virtual keyboard 821.

As another example, when there is no touch input for a predetermined time, the display device 100 may perform switching to the original screen 800 and the original virtual keyboard 820 from the reduced screen 801 and the reduced virtual keyboard 821.

As another example, the display device 100 may perform switching to the original screen 800 and the original virtual keyboard 820 from the reduced screen 801 and the reduced virtual keyboard 821 according to a selection of a button (not shown) included in the reduced virtual keyboard 821.

FIG. 8E is a view for describing a process of displaying a virtual keyboard according to keyboard information set in a mobile device connected to a display device when a touch input is performed according to an embodiment of the present disclosure.

The display device 100 and a mobile device 880 may connect to each other through a wireless communication standard such as Wi-Fi.

When a touch input is received, the display device 100 may receive information on a keyboard type set in the mobile device 880. The display device 100 may secure the information on the keyboard type from the mobile device 880 before receiving the touch input.

The display device 100 may perform matching of the keyboard type of the second virtual keyboard 830 to have a keyboard type set in the mobile device 880 according to the received information on the keyboard type.

For example, when the keyboard type of the mobile device 880 is a qwerty type, the keyboard type of the second virtual keyboard 830 may also be displayed in a qwerty type according to a touch input.

Accordingly, the user can use the keyboard type used in the mobile device 880 as it is without changing the setting of the keyboard type of the display device 100, thereby greatly improving convenience.

Figure 8F:
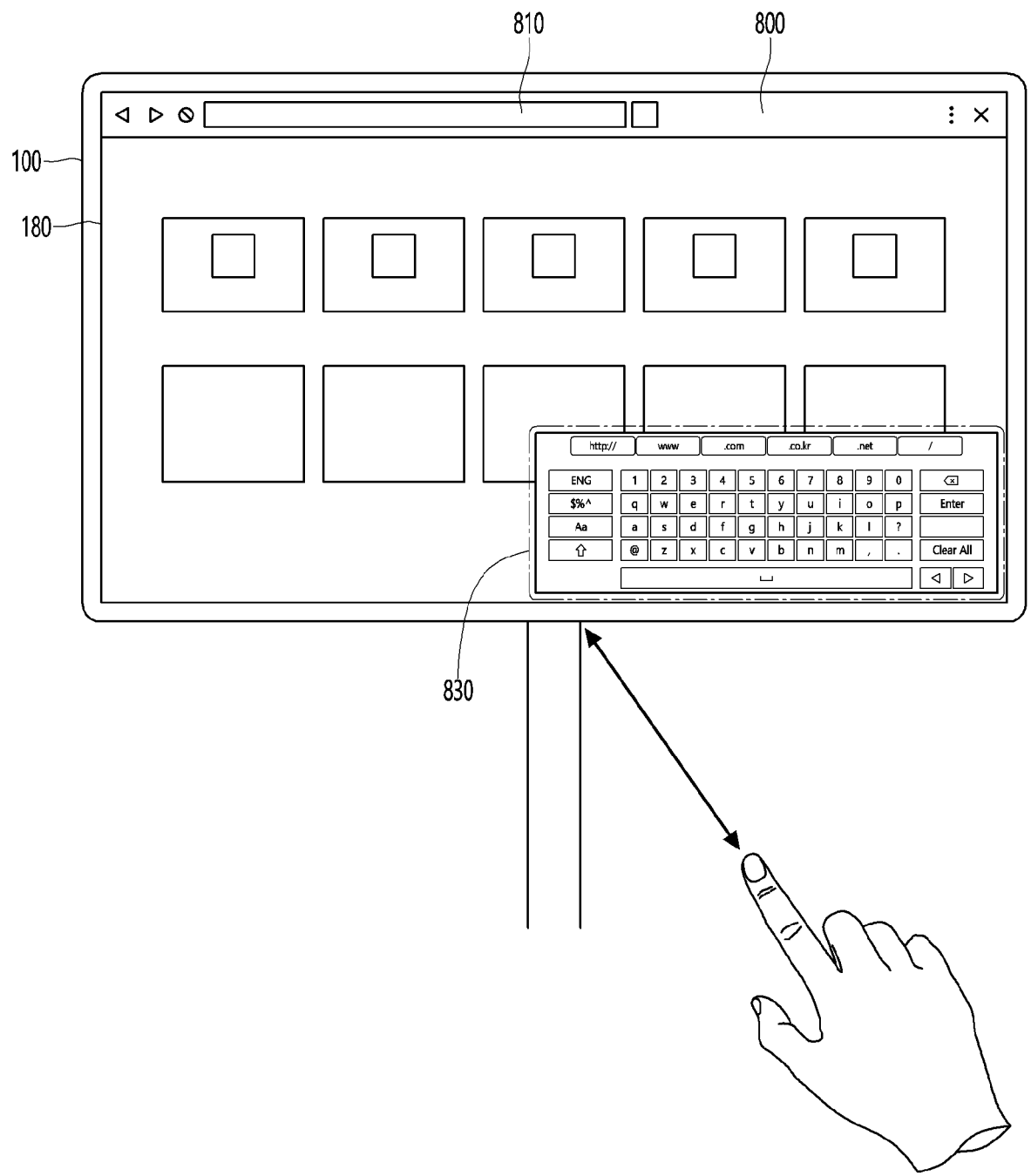
FIGS. 8F and 8G are views for describing an embodiment of providing different types of virtual keyboards according to postures of a display device.
Figure 8G:
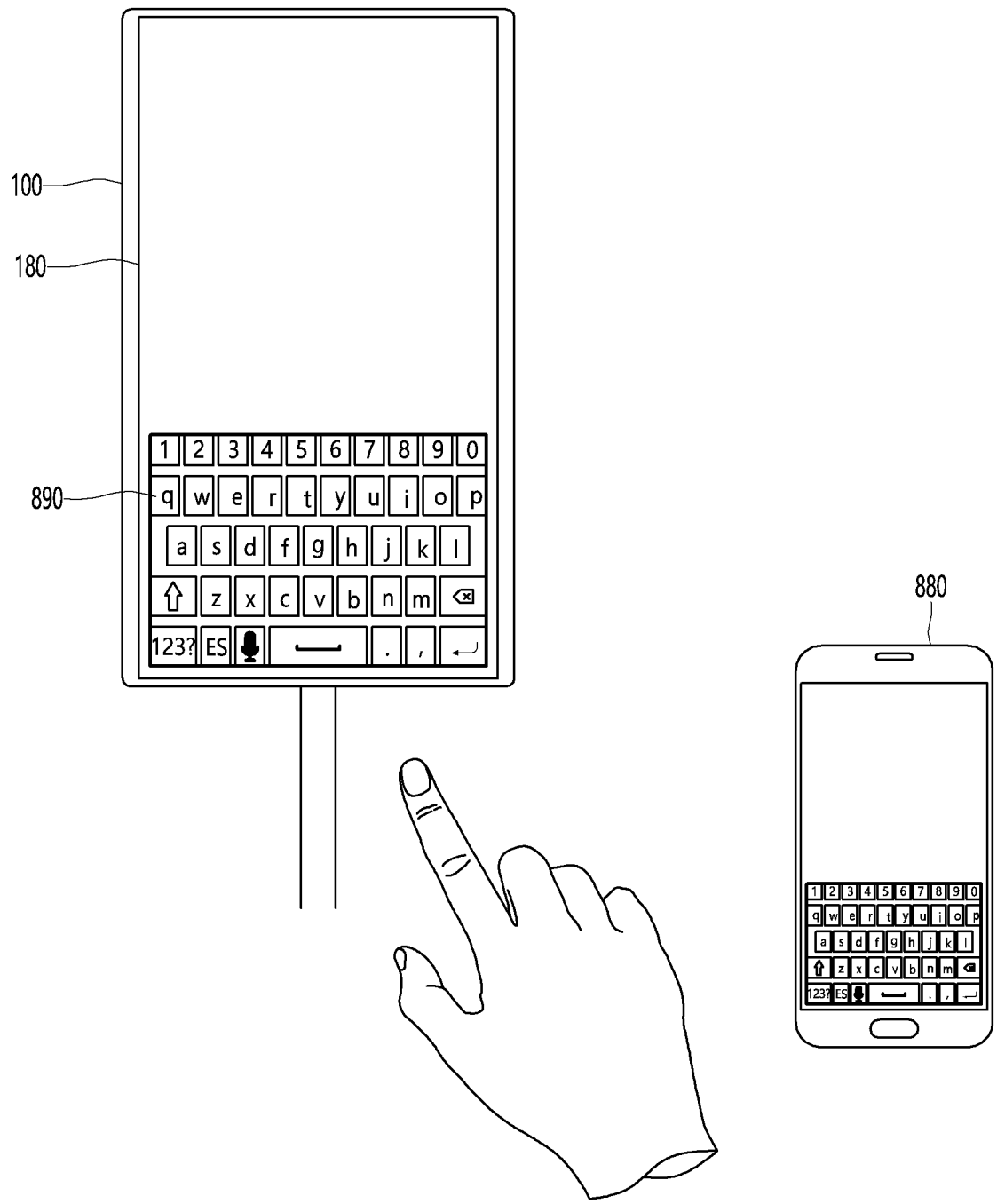

FIGS. 8F and 8G are views for describing an embodiment of providing different types of virtual keyboards according to postures of a display device.

The display device 100 may operate in a horizontal mode or a vertical mode according to a posture. The horizontal mode may be a landscape mode in which a horizontal length is greater than a vertical length, and the vertical mode may be a portrait mode in which the horizontal length is smaller than the vertical length.

In FIG. 8F, the display device 100 is in a landscape mode, and in FIG. 8G, the display device 100 is in a portrait mode.

Referring to FIG. 8F, when a touch input is received in the landscape mode, the display device 100 may display the second virtual keyboard 830 having a first keyboard type set in the display device 100.

Referring to FIG. 8G, when a touch input is received in the portrait mode, the display device 100 may display a third virtual keyboard 890 having a second keyboard type set in the mobile device 880 connected to the display device 100.

That is, when the display device 100 receives a touch input after switching from the landscape mode to the portrait mode, the display device 100 may switch from the second virtual keyboard 830 having the first keyboard type to the third virtual keyboard 890 having the second keyboard type.

As described above, according to an embodiment of the present disclosure, virtual keyboards having different keyboard types may be provided depending on the posture of the display device 100, thereby providing an improved user experience.

Figure 8H:
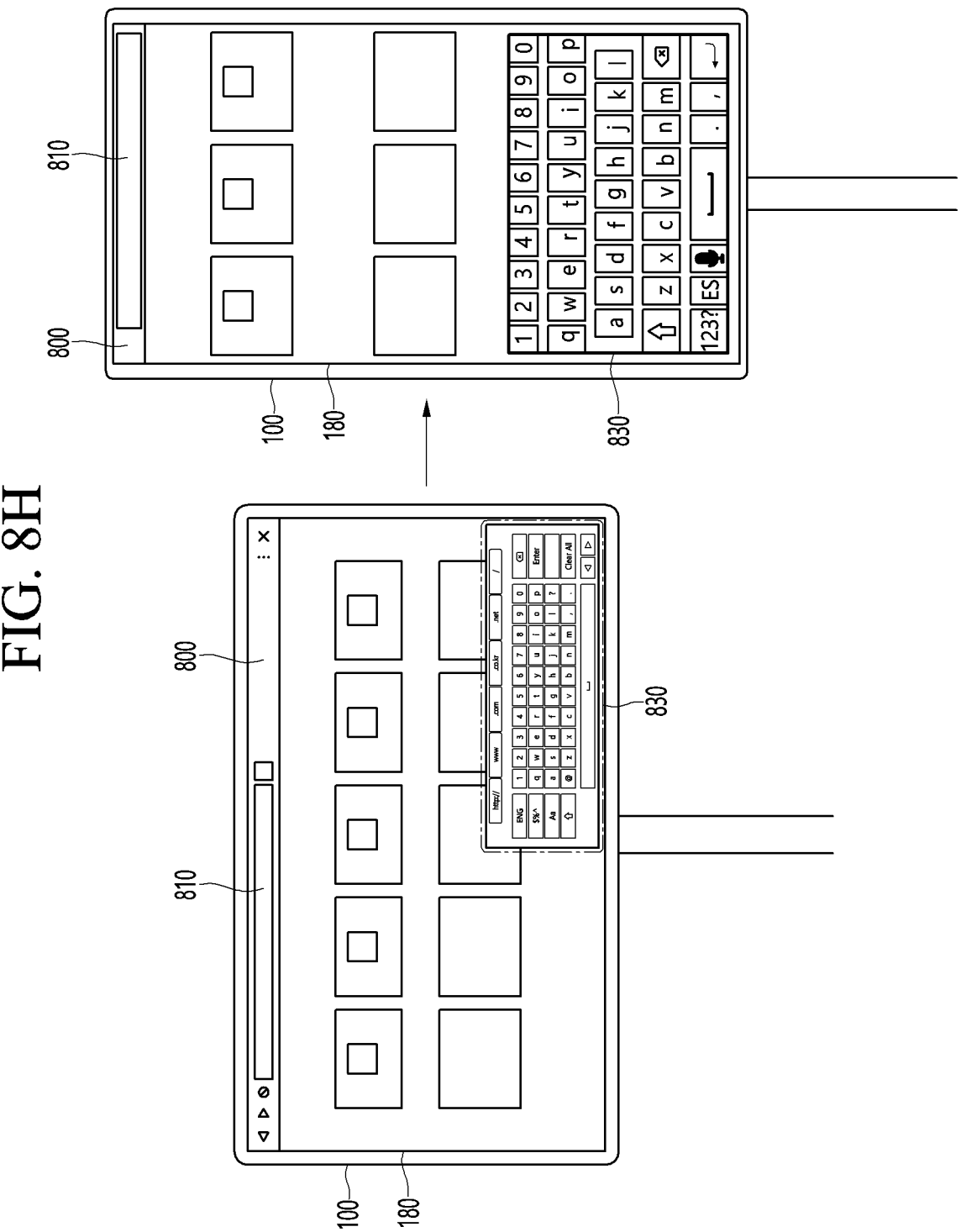
FIG. 8H is a view for describing an embodiment in which virtual keyboards of the same type are provided even when the posture of the display device is changed.

FIG. 8H is a view for describing an embodiment in which virtual keyboards of the same type are provided even when the posture of the display device is changed.

Referring to FIG. 8H, the display device 100 may display the second virtual keyboard 830 having the first keyboard type in the landscape mode.

In this state, when the posture of the display device 100 is changed from the landscape mode to the portrait mode, the display device 100 may display the second virtual keyboard 830 having the same type as the first keyboard type in the portrait mode.

In this case, when the keyboard type is changed according to the posture of the display device 100, the user may feel confused about the keyboard input because the keyboard layout is changed.

According to an embodiment of the present disclosure, in a state in which the second virtual keyboard 830 is displayed, even when the posture of the display device 100 is changed from the landscape mode to the portrait mode, the display device 100 may provide a virtual keyboard having the same keyboard type to prevent the user from feeling confused about the keyboard input.

Similarly, in a state in which the second virtual keyboard 830 is displayed, even when the posture of the display device 100 is changed from the portrait mode to the landscape mode, the display device 100 may display a virtual keyboard having the same keyboard type.

Figure 9:
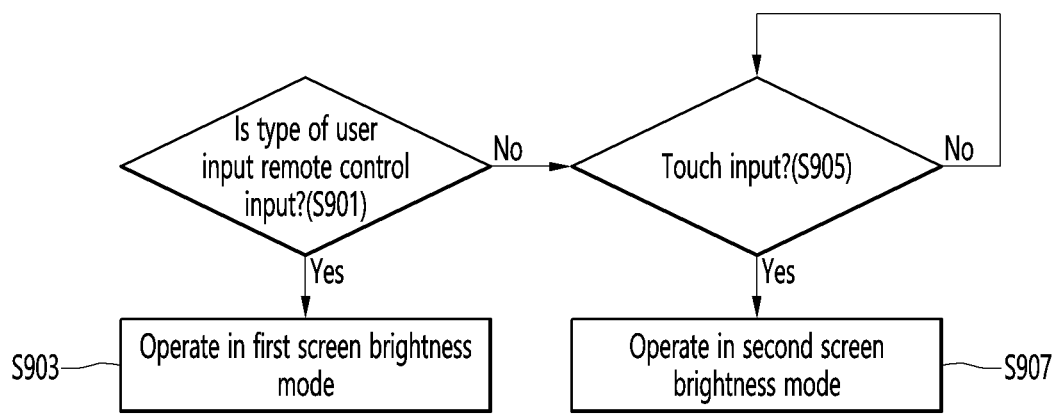
FIG. 9 is a diagram illustrating a flowchart of providing different screen brightness modes according to a type of a user input according to another embodiment of the present disclosure.

FIG. 9 is a diagram illustrating a flowchart of providing different screen brightness modes according to a type of a user input according to another embodiment of the present disclosure.

The embodiment of FIG. 9 may be a detailed view of steps S603 to S607 of FIG. 6.

Referring to FIG. 9, the controller 170 may determine whether a user input type is a remote control input type (S901).

When it is determined that the user input type is the remote control input type, the controller 170 may set a brightness mode of the display device 100 to a first screen brightness mode (S903).

When it is determined that the user input type is a touch input type (S905), the controller 170 may set the brightness mode of the display device 100 to a second screen brightness mode (S907).

The brightness modes of the display device 100 may include a first screen brightness mode for outputting default brightness and a second screen brightness mode for outputting brightness lower than the default brightness for power saving.

Figure 10A:
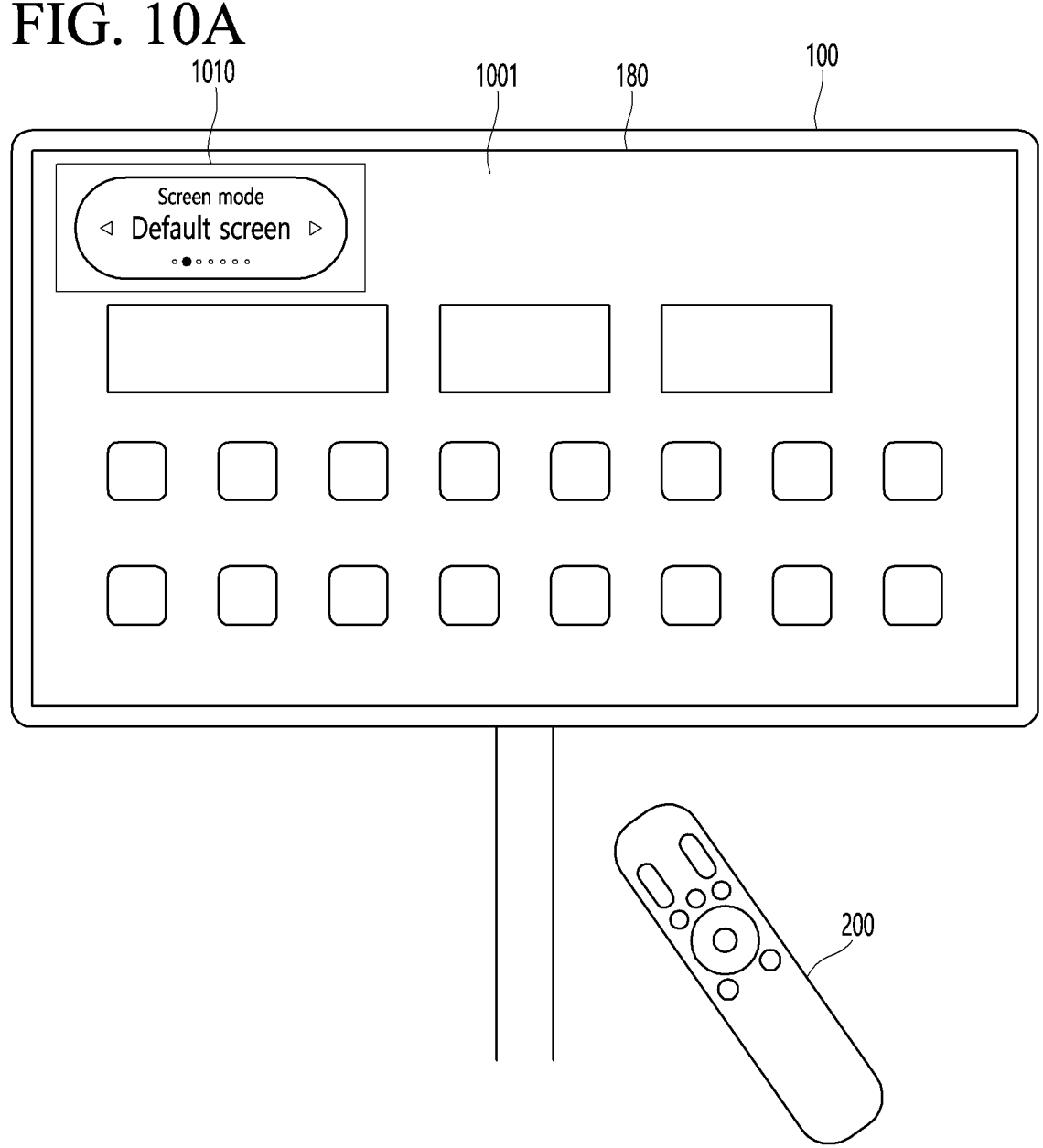

FIGS. 10A and 10B are diagrams for describing an example of providing different screen brightness modes according to a type of a user input.

Referring to FIG. 10A, when the user input type is a remote control input type, the display device 100 may display a first image 1001 having a first brightness on the display 180. At the same time, the display device 100 may display, on the display 180, a first brightness pop-up window 1010 indicating that the display device operates in the first screen brightness mode corresponding to the default brightness.

Referring to FIG. 10B, when the user input type is changed to a touch input type, the display device 100 may display a second image 1003 having a second brightness on the display 180. That is, when the user input type is changed from the remote control input type to the touch input type, the brightness of the image may be changed from the first brightness to the second brightness.

The display device 100 may display a second brightness pop-up window 1030 on the display 180 indicating that the display device operates in the second screen brightness mode, which is a mode of a power saving state rather than the default brightness.

When the user input type is a touch input type, the reason for reducing the brightness is to prevent glare when the user views images as the user is close to the display device 100.

As described above, according to an embodiment of the present disclosure, glare can be prevented in the case of the user's touch input control by adjusting the output brightness of the image according to the type of user input.

In another embodiment, when a touch input is received, the display device 100 may display a message inquiring about changing the brightness mode or a brightness adjustment menu for adjusting brightness instead of the brightness pop-up window 1030.

Figure 11:
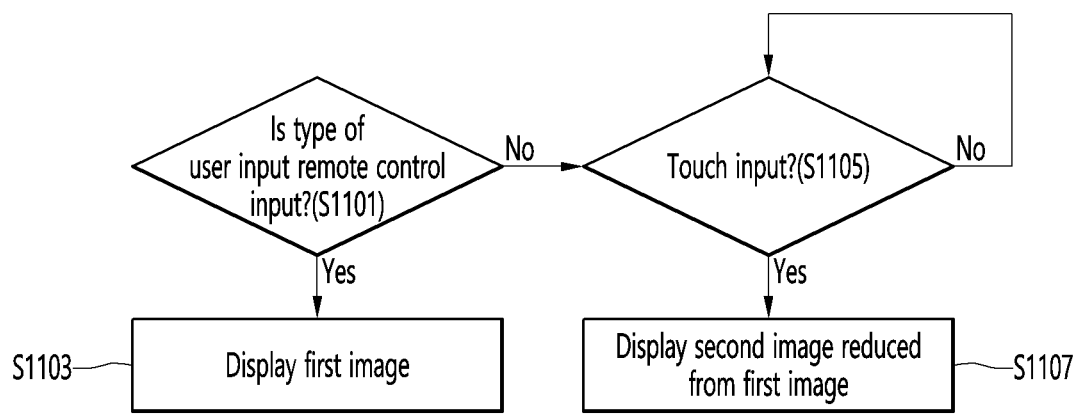
FIG. 11 is a diagram illustrating a flowchart of providing images of different sizes according to a type of a user input.

FIG. 11 is a diagram illustrating a flowchart of providing images of different sizes according to a type of a user input.

The embodiment of FIG. 11 may be a detailed view of steps S603 to S607 of FIG. 6.

Referring to FIG. 11, the controller 170 may determine whether a user input type is a remote control input type (S1101).

When it is determined that the user input type is the remote control input type, the controller 170 may display a first image having a first size on the display 180 (S1103).

According to an embodiment, the first size may be the size of the entire screen of the display 180.

When it is determined that the user input type is a touch input type (S1105), the controller 170 may display a second image having a second size smaller than that of the first image on the display 180 (S1107).

In an embodiment, the second size may be ¾ of the first size, but this is only an example.

Figure 12A:
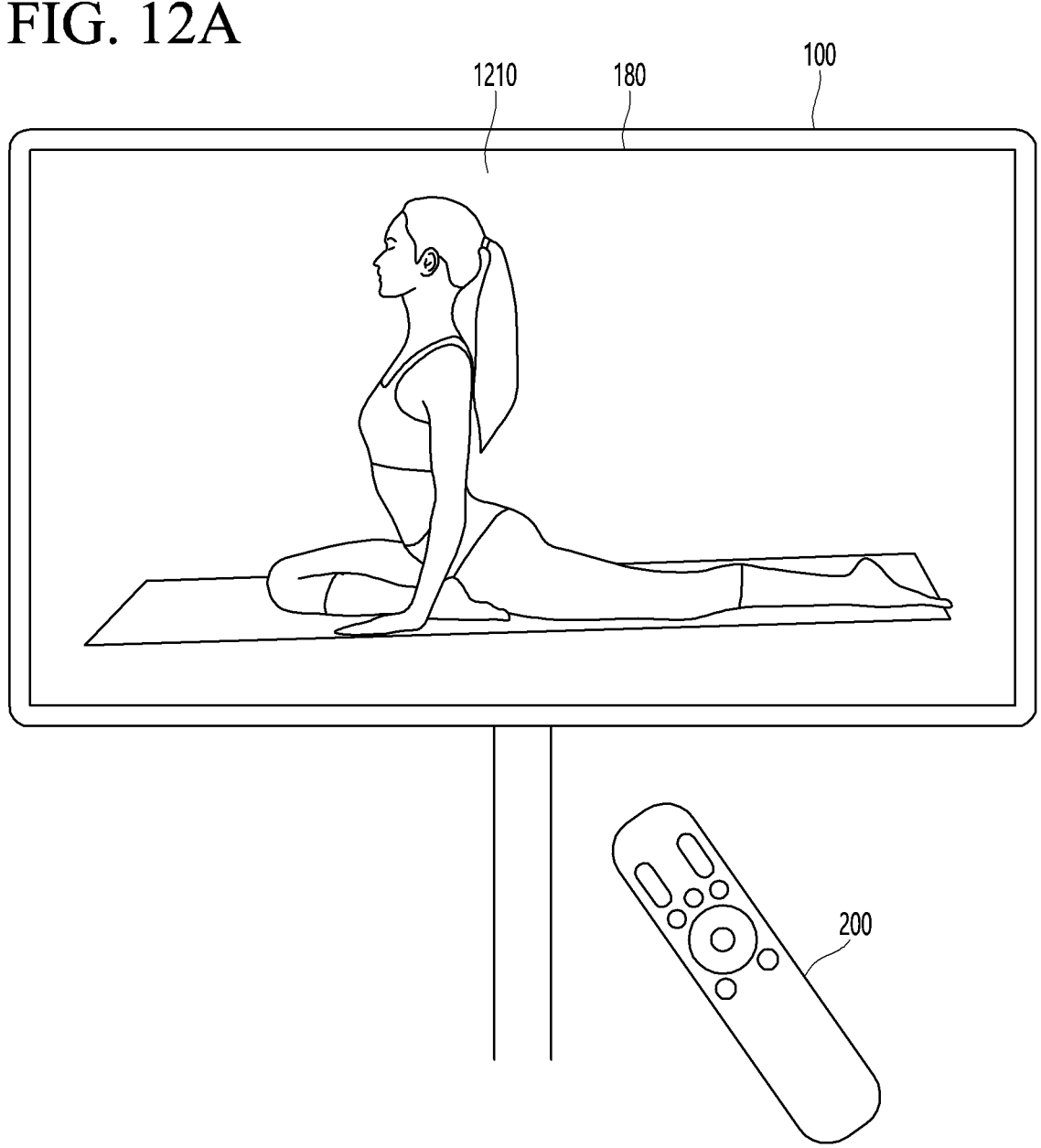
FIGS. 12A and 12B are diagrams for describing an example of providing different screen sizes according to a type of a user input.
Figure 12B:
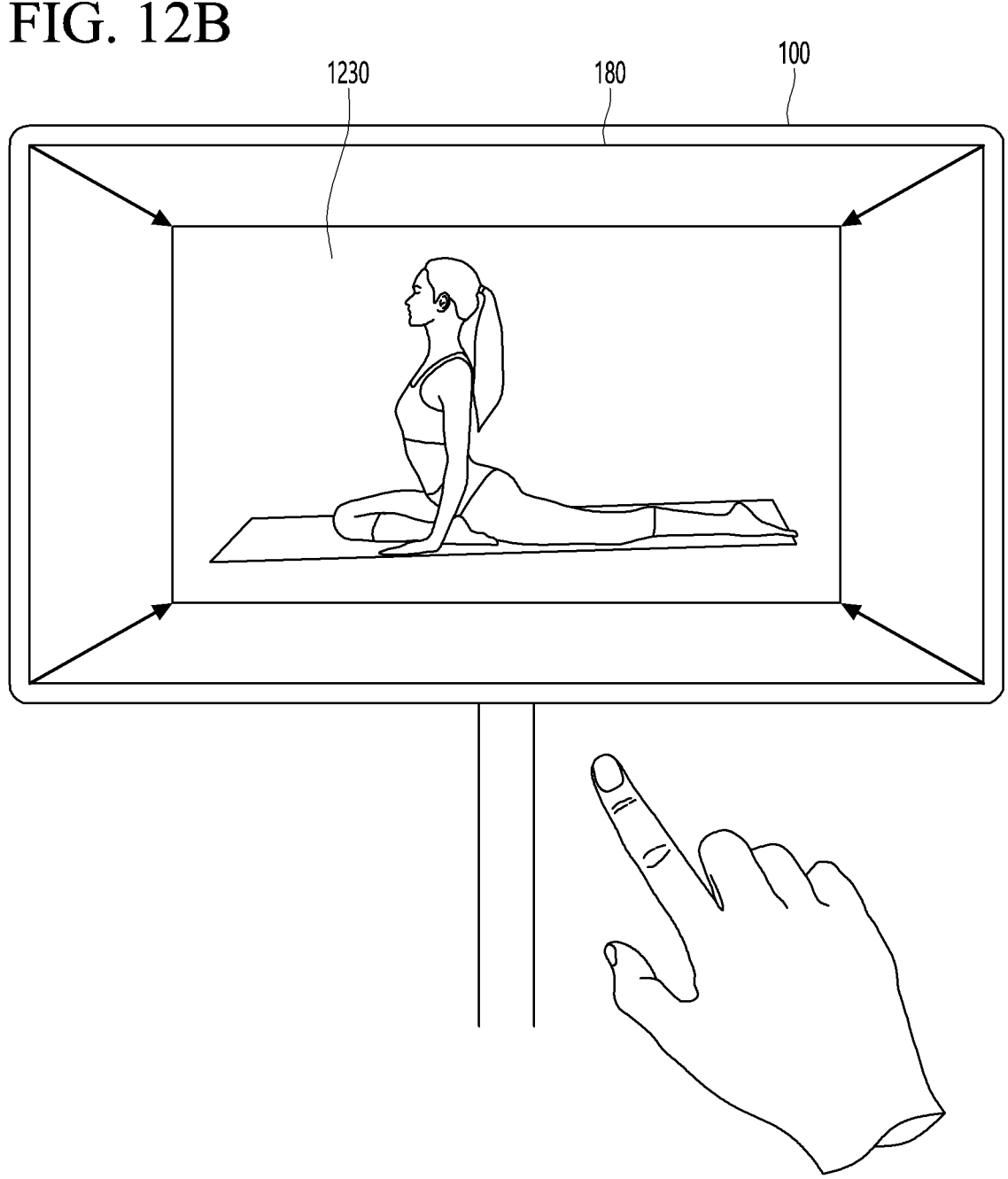

FIGS. 12A and 12B are diagrams for describing an example of providing different screen sizes according to a type of a user input.

when the user input type is a remote control input type, the display device 100 may display a first image 1210 having a first size on the display 180.

Referring to FIG. 12B, when the user input type is changed to a touch input type, the display device 100 may display a second image 1230 having a second size smaller than the first size on the display 180. That is, when the user input type is changed from the remote control input type to the touch input type, the size of the image may be reduced.

When the user input type is a touch input type, the reason for reducing the size of the image is that the image may not be visible at a glance when the user views the image as the user is close to the display device 100.

As described above, according to an embodiment of the present disclosure, the size of the image is adjusted according to the type of the user input, so that the image can be viewed at a glance in the case of the user's touch input control.

According to another embodiment of the present disclosure, when the user input type is changed from the remote control input type to the touch input type, the display device 100 may reduce the size of the image from the first size to the second size and, at the same time, reduce the brightness of the image from the first brightness to the second brightness.

That is, in the embodiment of FIG. 11, the embodiment of FIG. 9 may be simultaneously applied.

Figure 13:
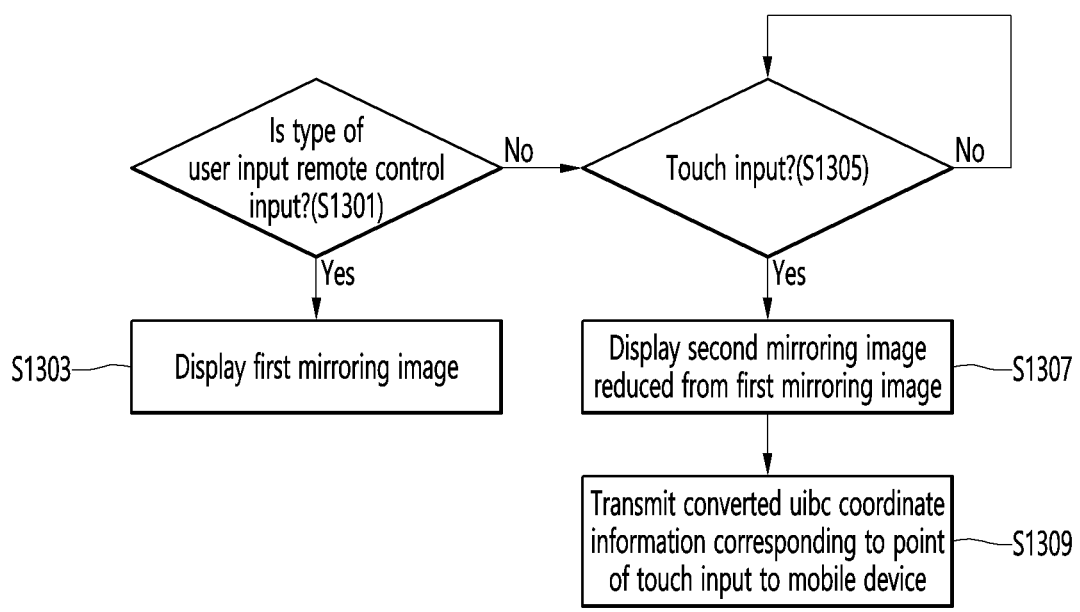
FIGS. 13 to 14B are diagrams for describing an embodiment of providing images of different sizes according to a type of a user input.
Figure 14A:
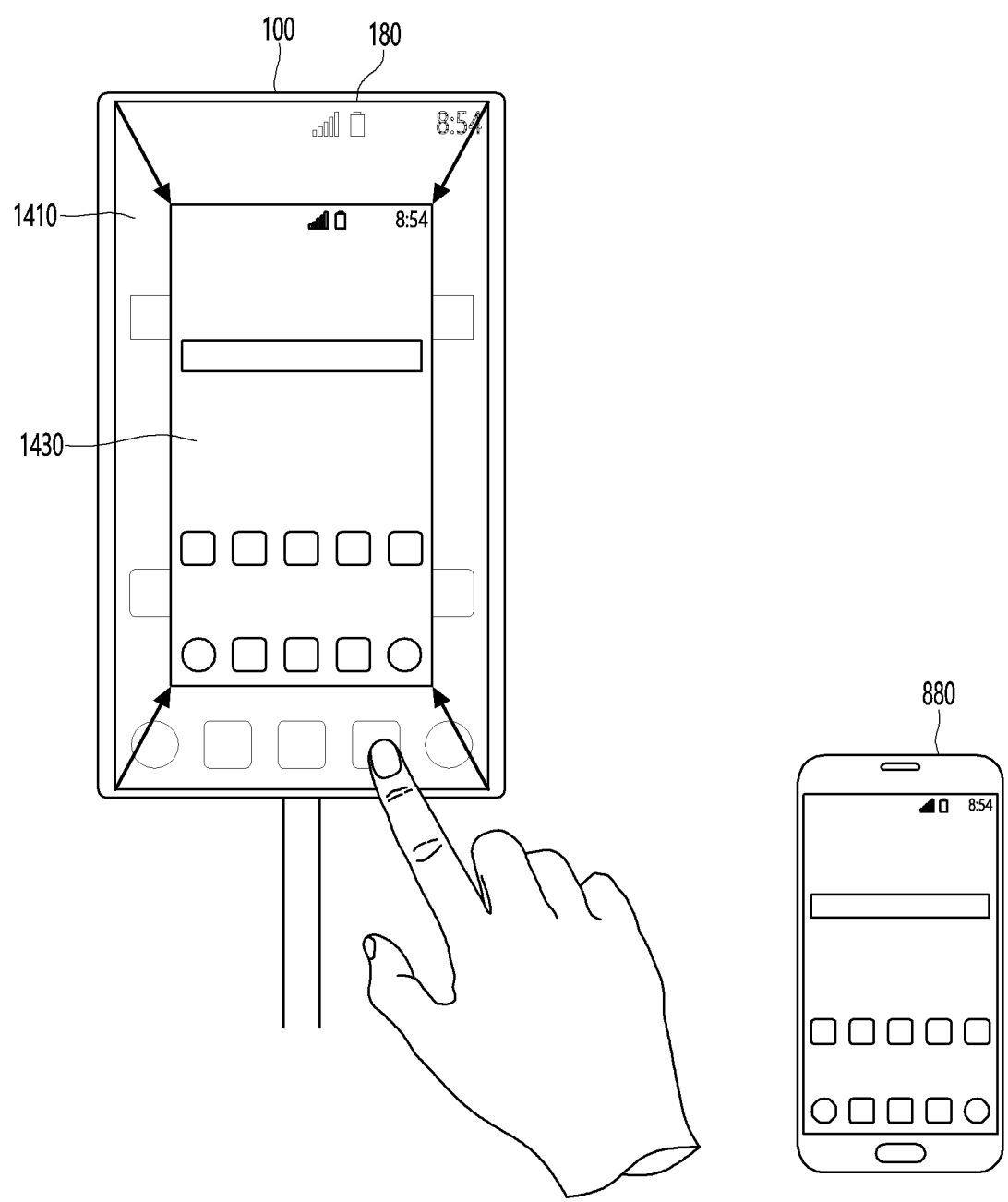
Figure 14B:
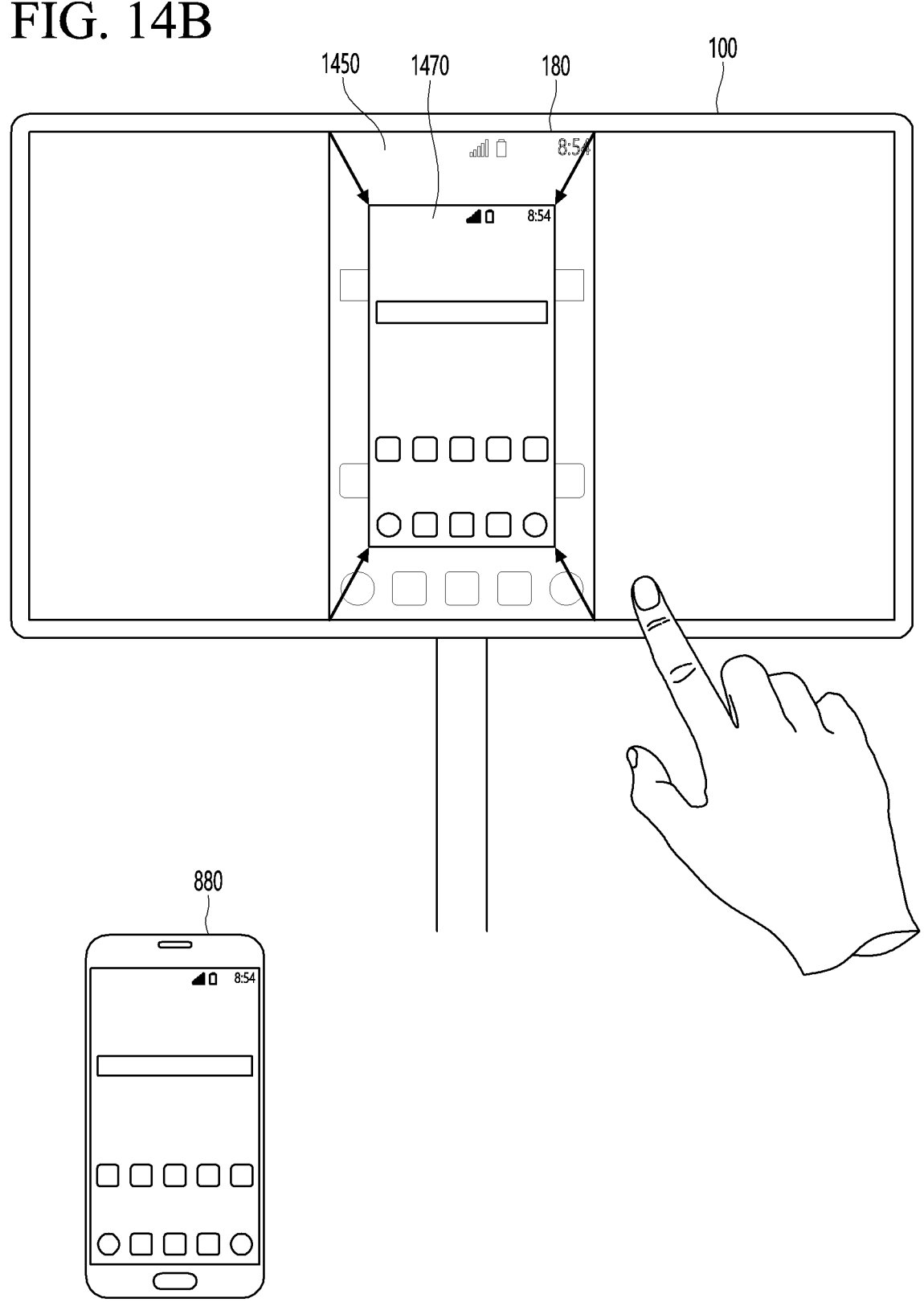

FIGS. 13 to 14B are diagrams for describing an embodiment of providing images of different sizes according to a type of a user input.

The embodiment of FIG. 13 may be a detailed view of steps S603 to S607 of FIG. 6.

In the embodiments of FIGS. 13 to 14B, it is assumed that the display device 100 provides a screen sharing (screen mirroring) service with the mobile device 880.

Referring to FIG. 13, the controller 170 may determine whether a user input type is a remote control input type (S1301).

When it is determined that the user input type is the remote control input type, the controller 170 may display a first mirroring image having a first size on the display 180 (S1303).

According to an embodiment, the first size may be the size of the entire screen of the display 180.

The first mirroring image may be an image corresponding to an image being displayed by the mobile device 880.

When it is determined that the user input type is a touch input type (S1305), the controller 170 may display a second mirroring image having a second size smaller than that of the first mirroring image on the display 180 (S1307).

The second size may be a size corresponding to ¾ of the first size, but this is only an example.

Referring to FIG. 14A, in the portrait mode, the display device 100 may display a first mirroring image 1410 on the display 180 before receiving a touch input. Thereafter, the display device 100 may switch from the first mirroring image 1410 having the first size into the second mirroring image 1430 having the second size as the touch input is received.

This is to reduce the mirroring image to facilitate the user's touch input and to allow the mirroring image to be viewed at a glance.

Thereafter, the controller 170 may transmit converted UIBC coordinate information corresponding to a touch input point on the second mirroring image 1430 to the mobile device 880 through the wireless communication interface 173 (S1309).

The controller 170 may receive a touch input for touching a point of the second mirroring image 1430, and obtain UIBC (User Input Back Channel) coordinates for the point of the touch input.

The user input back channel may be a channel for transmitting a control signal corresponding to a touch input received by the display device 100, which receives an image from the mobile device 880, to the mobile device 880.

The controller 170 may convert first UIBC coordinates of the touch point into second UIBC coordinates. The first UIBC coordinates may be coordinates of a point at which the touch input is received on the first mirroring image 1410, and the second UIBC coordinates may be coordinates of a point on the second mirroring image 1430 according to the reduction of the first mirroring image 1410.

The controller 170 may convert the first UIBC coordinates into the second UIBC coordinates to match an image reduction ratio, and transmit the converted second UIBC coordinates to the mobile device 880. The mobile device 880 may select a corresponding point based on the received second UIBC coordinates.

Referring to FIG. 14B, when the display device 100 receives a touch input in a landscape mode, a process of switching from a third mirroring image 1450 being displayed into a fourth mirroring image 1470 is illustrated.

Similarly to the embodiment of FIG. 14A, the fourth mirroring image 1470 may have a size reduced by a certain ratio compared to the third mirroring image 1450.

Figure 15:
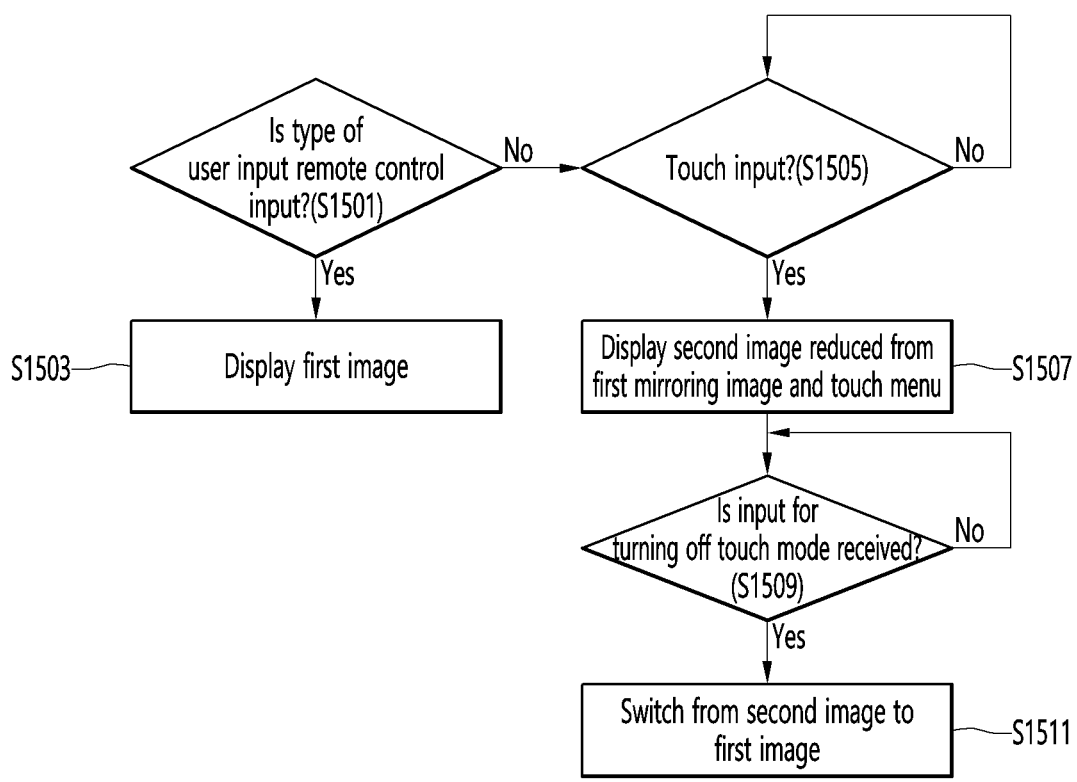
FIGS. 15 to 16B show embodiments for describing operation depending on whether a touch mode is maintained.
Figure 16A:
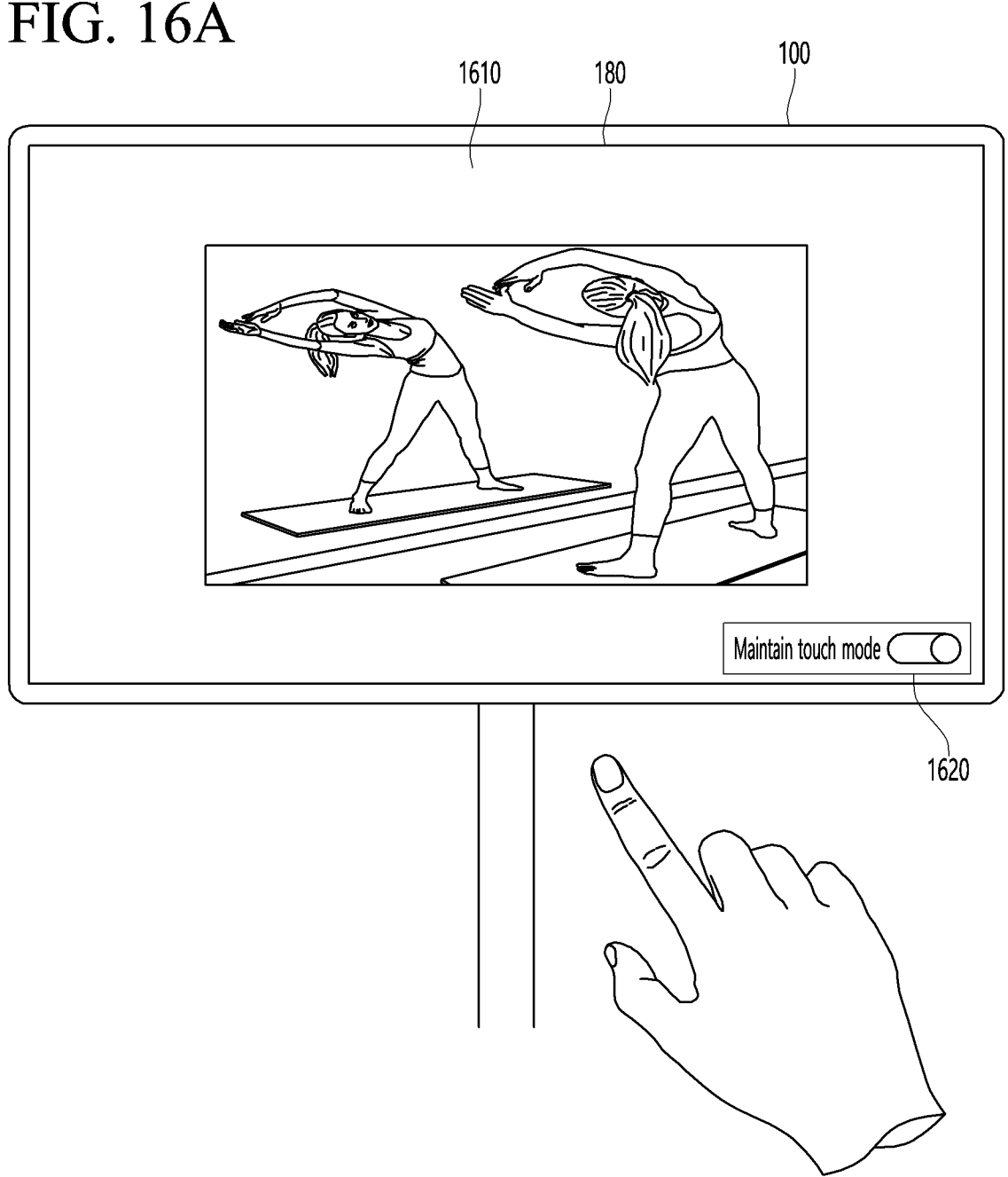
Figure 16B:
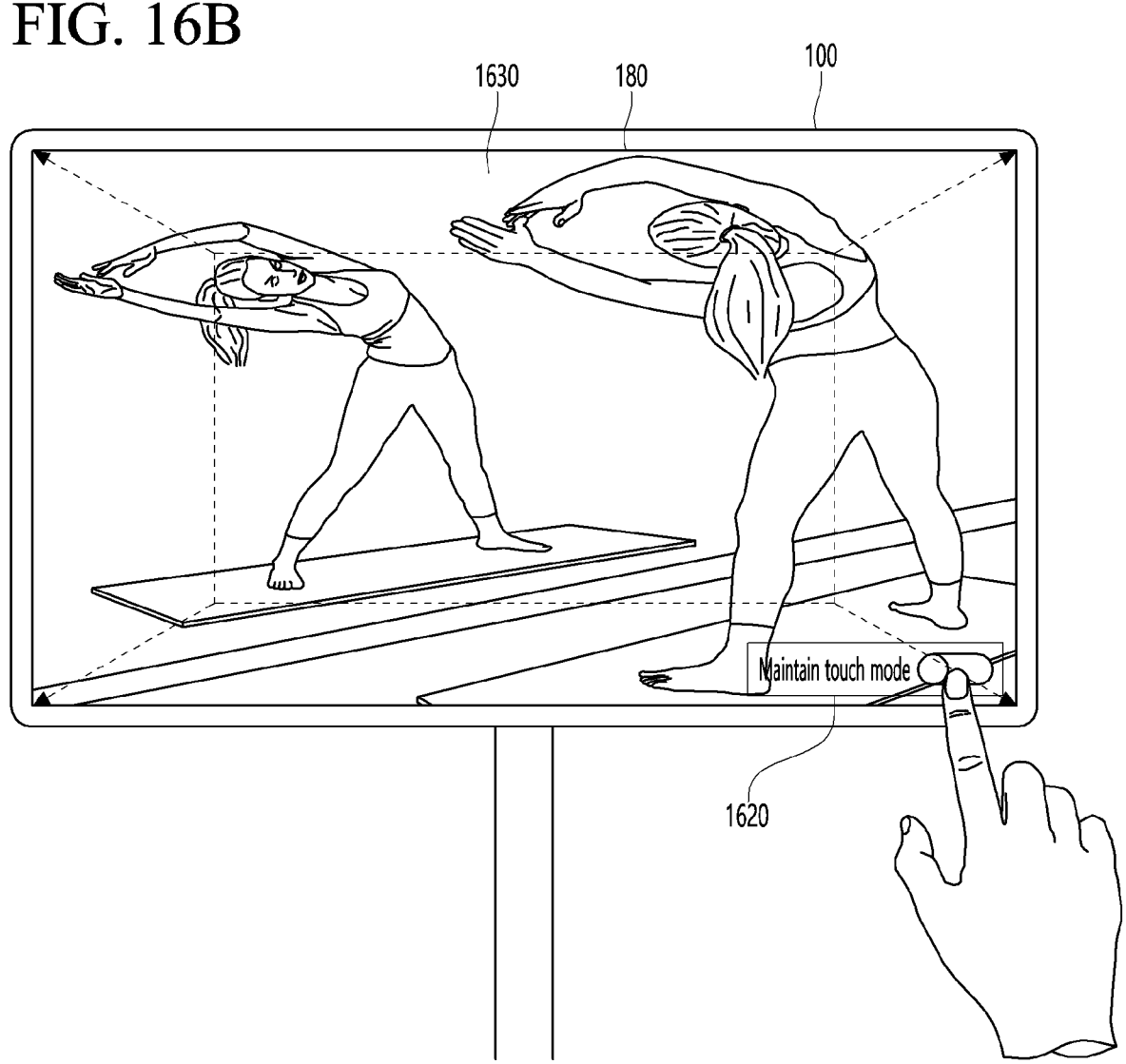

FIGS. 15 to 16B shows embodiments for describing operation depending on whether a touch mode is maintained.

The embodiment of FIG. 15 may be a detailed view of steps S603 to S607 of FIG. 6.

Referring to FIG. 15, the controller 170 may determine whether a user input type is a remote control input type (S1501).

When it is determined that the user input type is the remote control input type, the controller 170 may display a first image having a first size on the display 180 (S1503). According to an embodiment, the first size may be the size of the entire screen of the display 180.

When it is determined that the user input type is a touch input type (S1505), the controller 170 may display a second image having a second size smaller than that of the first image and a touch menu on the display 180 (S1507).

According to an embodiment, the touch menu may be a menu providing a button for setting whether to maintain the touch mode. The display device 100 may receive one of an ON input for maintaining the touch mode and an OFF input for releasing the touch mode through the touch menu.

The touch mode may be a mode for controlling operation of the display device 100 through a touch input. In the touch mode, the size of the image may be reduced, and the brightness of the image may also be reduced.

Referring to FIG. 16A, when a touch input is received, the display device 100 may display a reduced second image 1610 and a touch menu 1620 which is in a turned-on state, on the display 180.

The controller 170 may determine whether an OFF input for turning off the touch mode is received (S1509), and when receiving the OFF input, switch from the reduced second image to a first image having an original size (S1511).

At the same time, the controller 170 may control a screen output to be the original brightness of the first image.

The controller 170 may turn off the touch menu 1620 according to the OFF input, and may switch from the reduced second image 1610 to the first image 1630 having the original size.

The reduced second image 1610 may be switched to the first image 1630 while the gradation effect is being applied.

In another embodiment, even if the OFF input is not received, when the touch input is not received for a predetermined period of time, the touch mode may be released.

As described above, according to an embodiment of the present disclosure, when a touch input is received, a selection option for maintaining the touch mode is provided to a user, thus allowing the user to more proactively control the operation of the display device 100.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A display device comprising:
   a display configured to display an image;
   a user input interface configured to receive a remote control input from a remote control; and
   a controller configured to receive a user input, obtain a type of the received user input, and change a display property according to the obtained type of the user input,
   wherein the type of the user input is one of a remote control input type or a touch input, and
   wherein the controller is configured to:
      display a first virtual keyboard having a first size on the display when the type of the user input is the remote control input type, and
      display a second virtual keyboard having a second size smaller than the first size on the display when the type of the user input is changed from the remote control input type to the touch input type.

2. The display device of claim 1, wherein the controller is configured to display a reduced image of the image and the second virtual keyboard on the display around a point at which the touch input is received.

3. The display device of claim 1, further comprising:
   a wireless communication interface configured to perform wireless communication with a mobile device,
   wherein the controller is configured to set a keyboard type of the second virtual keyboard to a keyboard type set in the mobile device when the display device is connected to the mobile device.

4. The display device of claim 1, wherein the controller is configured to output the image with a first brightness when the type of the user input is the remote control input type, and output the image with a second brightness smaller than the first brightness when the type of the user input is the touch input type.

5. The display device of claim 4, wherein the controller is configured to display a first brightness pop-up window indicating that the image is output with the first brightness when the type of the user input is the remote control input type, and display a second brightness pop-up window indicating that the image is output with the second brightness when the type of the user input is the touch input type.

6. The display device of claim 4, wherein the controller is configured to output the image with a first brightness when the type of the user input is the remote control input type, and display a reduced image of the image while outputting the image with the second brightness smaller than the first brightness when the type of the user input is changed to the touch input type.

7. The display device of claim 1, wherein the controller is configured to reduce and display the image displayed in an entire area of the display when the type of the user input is changed from the remote control input type to the touch input type.

8. The display device of claim 7, wherein the controller is configured to further display a touch menu for setting whether to maintain a touch mode.

9. The display device of claim 8, wherein the controller is configured to restore the reduced image to its original size when the touch mode is released through the touch menu.

10. The display device of claim 1, further comprising:
a wireless communication interface configured to receive an image signal corresponding to a source image being displayed by a mobile device,
wherein the controller is configured to
display a first mirroring image on the display based on the image signal, and
display a second mirroring image reduced from the first mirroring image when the type of the user input is changed from the remote control input type to the touch input type.

11. The display device of claim 10, wherein the controller is configured to convert UIBC coordinates corresponding to a point of a touch input received on the second mirroring image to match a reduced ratio of a mirroring image, and transmit the converted UIBC coordinates to the mobile device.

12. The display device of claim 1, further comprising:
a shaft connected to a rear surface of the display and extending vertically; and
a stand base connected to a lower end of the shaft.

13. A method of operating a display, comprising:
displaying an image;
receiving a user input;
obtaining a type of the received user input; and
changing a display property according to the obtained type of the user input,
wherein the type of the user input is one of a remote control input type or a touch input, and
wherein the method further comprises:
displaying a first virtual keyboard having a first size on the display when the type of the user input is the remote control input type, and
displaying a second virtual keyboard having a second size smaller than the first size on the display when the type of the user input is changed from the remote control input type to the touch input type.

14. A display device comprising:
a display configured to display an image;
a user input interface configured to receive a remote control input from a remote control; and
a controller configured to receive a user input, obtain a type of the received user input, and change a display property according to the obtained type of the user input,
wherein the type of the user input is one of a remote control input type or a touch input,
wherein the controller is further configured to:
display a virtual keyboard having a preset keyboard type when a touch input is received in a case where a posture of the display is in a landscape mode, and
display a virtual keyboard having a keyboard type set in a mobile device connected to the display device when a touch input is received in a case where a posture of the display is in a portrait mode.

* * * * *